US011224096B2

(12) United States Patent
Huang

(10) Patent No.: US 11,224,096 B2
(45) Date of Patent: Jan. 11, 2022

(54) METHOD AND APPARATUS FOR CONFIGURING POWER CONSUMPTION PARAMETER

(71) Applicant: HUAWEI TECHNOLOGIES CO., LTD., Guangdong (CN)

(72) Inventor: Zhenglei Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 16/579,503

(22) Filed: Sep. 23, 2019

(65) Prior Publication Data
US 2020/0022216 A1 Jan. 16, 2020

Related U.S. Application Data

(63) Continuation of application No. PCT/CN2017/078153, filed on Mar. 24, 2017.

(51) Int. Cl.
H04W 88/04 (2009.01)
H04W 76/28 (2018.01)
H04W 76/30 (2018.01)
H04W 52/02 (2009.01)

(52) U.S. Cl.
CPC ....... H04W 88/04 (2013.01); H04W 52/0235 (2013.01); H04W 76/28 (2018.02); H04W 76/30 (2018.02)

(58) Field of Classification Search
CPC ..... H04W 88/04; H04W 76/28; H04W 76/30; H04W 52/0235
See application file for complete search history.

(56) References Cited

U.S. PATENT DOCUMENTS

2008/0031174 A1* 2/2008 Saifullah ............... H04B 7/155
370/311
2009/0315752 A1 12/2009 Bank et al.
2012/0297223 A1 11/2012 Wu et al.
2015/0109979 A1 4/2015 Miklós et al.
(Continued)

FOREIGN PATENT DOCUMENTS

CN 101801072 A 8/2010
CN 102378329 A 3/2012
(Continued)

OTHER PUBLICATIONS

Office Action issued in Chinese Application No. 201780076184.1 dated Jun. 3, 2020, 22 pages (with English translation).
(Continued)

Primary Examiner — Eric Myers
(74) Attorney, Agent, or Firm — Fish & Richardson P.C.

(57) ABSTRACT

Example power consumption parameter configuring methods and apparatus are described. In one example method, when a core network control plane device determines a configured value of a power consumption parameter of the relay device and a configured value of a power consumption parameter of the terminal device, an expected value of the power consumption parameter of the terminal device and an expected value of the power consumption parameter of the relay device are considered. This avoids data transmission failure caused by sending data to a network side by the terminal device through the relay device when the relay device is in a sleep state.

9 Claims, 12 Drawing Sheets

(56) References Cited

U.S. PATENT DOCUMENTS

| | | | |
|---|---|---|---|
| 2016/0073344 A1 | 3/2016 | Vutukuri et al. | |
| 2016/0119873 A1 | 4/2016 | Dai et al. | |
| 2016/0142974 A1 | 5/2016 | Lindoff et al. | |
| 2017/0230941 A1* | 8/2017 | Agiwal | H04W 72/04 |
| 2017/0359835 A1* | 12/2017 | Seo | H04W 72/14 |
| 2018/0242279 A1 | 8/2018 | Guo et al. | |

FOREIGN PATENT DOCUMENTS

| | | | |
|---|---|---|---|
| CN | 102577165 | A | 7/2012 |
| CN | 103179644 | A | 6/2013 |
| CN | 103974347 | A | 8/2014 |
| CN | 104144480 | A | 11/2014 |
| CN | 104429152 | A | 3/2015 |
| CN | 105009478 | A | 10/2015 |
| WO | 2015169406 | A1 | 11/2015 |

OTHER PUBLICATIONS

3GPP TS 23.401 V14.3.0 (Mar. 2017), "3rd Generation Partnership Project; Technical Specification Group Services and System Aspects; General Packet Radio Service (GPRS) enhancements for Evolved Universal Terrestrial Radio Access Network (E-UTRAN) access (Release 14)," Mar. 2017, 386 pages.

PCT International Search Report and Written Opinion issued in International Application No. PCT/CN2017/078153 dated Dec. 27, 2017, 23 pages (with English translation).

Office Action issued in Chinese Application No. 201780076184.1 dated Apr. 29, 2021, 4 pages.

Sequans Communications,"Power efficient relay discovery maintenance and establishment",3GPP TSG-RAN WG2 Meeting #97 R2-1701648, Athens, Greece, Feb. 13-17, 2017,10 pages.

Extended European Search Report issued in European Application No. 17902441.9 dated Jan. 24, 2020, 9 pages.

\* cited by examiner

METHOD AND APPARATUS FOR CONFIGURING POWER CONSUMPTION PARAMETER

CROSS-REFERENCE TO RELATED APPLICATIONS

This application is a continuation of International Application No. PCT/CN2017/078153, filed on Mar. 24, 2017, the disclosure of which is hereby incorporated by reference in its entirety.

TECHNICAL FIELD

This application relates to the field of communications technologies, and in particular, to a method and an apparatus for configuring a power consumption parameter.

BACKGROUND

With the development of communications technologies, terminal devices capable of implementing different functions emerge one after another. The terminal devices, for example, smart meters and wearable devices, may be deployed in application scenarios of fields such as measurement, construction, agriculture, smart city, home, and logistics. The terminal devices have relatively small battery capacities and are not easy to charge. Therefore, how to reduce power consumption of the terminal devices is a problem to be urgently resolved by a researcher in the communications field.

Currently, a method for reducing power consumption includes: using a power saving mode (PSM), and/or using an extended discontinuous reception (eDRX) technology.

However, the foregoing method for reducing power consumption cannot be effectively applied when a terminal device accesses a network by using a relay device. For example, assuming that both the terminal device and the relay device use the foregoing method for reducing power consumption, when the relay device is in the PSM, the terminal device cannot send data to the network.

SUMMARY

Embodiments of this application provide a method and an apparatus for configuring a power consumption parameter, to reduce power consumption of a terminal device and a relay device while ensuring data transmission efficiency of the terminal device in a scenario in which the terminal device accesses a network by using the relay device.

According to a first aspect, an embodiment of this application provides a method for configuring a power consumption parameter, where the method includes: after receiving an expected value of a power consumption parameter of a relay device and an expected value of a power consumption parameter of a terminal device, determining, by a core network control plane device, a configured value of the power consumption parameter of the relay device and a configured value of the power consumption parameter of the terminal device based on the expected value of the power consumption parameter of the relay device and the expected value of the power consumption parameter of the terminal device; and finally, sending, by the core network control plane device, the configured value of the power consumption parameter of the relay device and the configured value of the power consumption parameter of the terminal device to the relay device.

In the foregoing method, both the configured value of the power consumption parameter of the relay device and the configured value of the power consumption parameter of the terminal device that accesses a RAN by using the relay device are determined based on the expected value of the power consumption parameter of the terminal device and the expected value of the power consumption parameter of the relay device. This avoids data transmission failure caused by sending data to a network side by the terminal device through the relay device when the relay device is in a sleep state. Therefore, the method not only reduces power consumption of the relay device and the terminal device, but also ensures data transmission efficiency of the terminal device.

In a possible design, the core network control plane device may receive the expected value of the power consumption parameter of the relay device and the expected value of the power consumption parameter of the terminal device in the following manner: The core network control plane device receives an attach request message or a location update request message sent by the relay device, where the attach request message or the location update request message carries the expected value of the power consumption parameter of the relay device and the expected value of the power consumption parameter of the terminal device.

In a possible design, the core network control plane device may send the configured value of the power consumption parameter of the relay device and the configured value of the power consumption parameter of the terminal device to the relay device in the following manner: The core network control plane device adds the configured value of the power consumption parameter of the relay device and the configured value of the power consumption parameter of the terminal device to an attach accept message or a location update accept message, and sends the message to the relay device.

In a possible design, the power consumption parameter includes at least one of power saving mode PSM activation time, periodic location update timer duration, and extended discontinuous reception eDRX cycle duration.

The foregoing design can improve diversity of configuring the power consumption parameters of the terminal device and the relay device by the core network control plane device.

In a possible design, the core network control plane device may determine the configured value of the power consumption parameter of the relay device and the configured value of the power consumption parameter of the terminal device by performing the following steps:

The core network control plane device first determines the configured value of the power consumption parameter of the terminal device based on the expected value of the power consumption parameter of the terminal device, and then determines the configured value of the power consumption parameter of the relay device based on the expected value of the power consumption parameter of the relay device and the configured value of the power consumption parameter of the terminal device.

In the foregoing design, the core network control plane device first configures the power consumption parameter of the terminal device based on the expected value of the power consumption parameter of the terminal device, so that the configured value of the power consumption parameter of the terminal device satisfies a data transmission requirement and a power consumption reduction requirement of the terminal device. Then the core network control plane device determines the configured value of the power consumption parameter of the relay device based on the configured value of the power consumption parameter of the terminal device and the expected value of the power consumption parameter of the relay device, so that the configured value of the power consumption parameter of the relay device ensures data transmission efficiency of the terminal device; in addition, the configured value of the power consumption parameter of the relay device also satisfies a power consumption reduction requirement of the relay device.

In a possible design, when a quantity of terminal devices is greater than 1, the power consumption parameter includes the PSM activation time, a configured value of PSM activation time of the relay device is greater than or equal to a largest one of configured values of PSM activation time of the terminal devices, and the configured value of the PSM activation time of the relay device is greater than or equal to an expected value of the PSM activation time of the relay device.

In the design, because the configured value of the PSM activation time of the relay device is greater than or equal to the largest one of the configured values of the PSM activation time of the terminal devices, when the terminal devices include a terminal device that does not enter a PSM, the relay device does not enter the PSM either. To be specific, the relay device does not enter the PSM earlier than the terminal device. Therefore, data transmission efficiency of the terminal device is ensured, while power consumption of the relay device is reduced.

In a possible design, when a quantity of terminal devices is greater than 1, the power consumption parameter includes the periodic location update timer duration, a configured value of periodic location update timer duration of the relay device is less than or equal to a smallest one of configured values of periodic location update timer duration of the terminal devices, and the configured value of the periodic location update timer duration of the relay device is less than or equal to an expected value of the periodic location update timer duration of the relay device.

The foregoing design can ensure that after both the relay device and the terminal device enter an idle state, the relay device can enter an active state earlier than the terminal device. To be specific, the relay device enters the active state when or before the terminal device enters the active state. This ensures that the relay device does not affect data transmission of the terminal device, and further ensures data transmission efficiency of the terminal device.

In a possible design, the core network control plane device may determine the configured value of the power consumption parameter of the terminal device based on the expected value of the power consumption parameter of the terminal device by performing the following step: The core network control plane device determines the configured value of the power consumption parameter of the terminal device based on subscription data of the power consumption parameter of the terminal device and the expected value of the power consumption parameter of the terminal device. Correspondingly, the core network control plane device determines the configured value of the power consumption parameter of the relay device based on the expected value of the power consumption parameter of the relay device and the configured value of the power consumption parameter of the terminal device by performing the following step: The core network control plane device determines the configured value of the power consumption parameter of the relay device based on subscription data of the power consumption parameter of the relay device, the expected value of the power consumption parameter of the relay device, and the configured value of the power consumption parameter of the terminal device, where the configured value of the power consumption parameter of the relay device belongs to the subscription data of the power consumption parameter of the relay device.

The foregoing design can ensure that the configured value of the power consumption parameter of the relay device satisfies a requirement of the subscription data of the power consumption parameter of the relay device, and ensure that the configured value of the power consumption parameter of the terminal device satisfies a requirement of the subscription data of the power consumption parameter of the terminal device.

In a possible design, the power consumption parameter includes the PSM activation time, and both a configured value of PSM activation time of the relay device and a configured value of PSM activation time of the terminal device are a larger one of an expected value of the PSM activation time of the terminal device and an expected value of the PSM activation time of the relay device.

The foregoing design can ensure that the relay device does not enter a PSM earlier than the terminal device. Therefore, data transmission efficiency of the terminal device is ensured, while power consumption of the relay device is reduced.

In a possible design, the power consumption parameter includes the periodic location update timer duration, and both a configured value of periodic location update timer duration of the relay device and a configured value of periodic location update timer duration of the terminal device are a smaller one of an expected value of the periodic location update timer duration of the terminal device and an expected value of the periodic location update timer duration of the relay device.

The foregoing design can ensure that the relay device and the terminal device enter an active state simultaneously after both the relay device and the terminal device enter an idle state. This ensures that the relay device does not affect data transmission of the terminal device, and further ensures data transmission efficiency of the terminal device.

In a possible design, the power consumption parameter includes the eDRX cycle duration, and both a configured value of eDRX cycle duration of the relay device and a configured value of eDRX cycle duration of the terminal device are a smaller one of an expected value of the eDRX cycle duration of the terminal device and an expected value of the eDRX cycle duration of the relay device.

The foregoing design can satisfy requirements on latencies in receiving downlink data by the terminal device and the relay device, and ensure data transmission efficiency of the terminal device.

In a possible design, the core network control plane device may further determine the configured value of the power consumption parameter of the relay device based on the expected value of the power consumption parameter of the relay device and the expected value of the power consumption parameter of the terminal device by performing the following steps: The core network control plane device first determines a candidate configured value of the power consumption parameter of the terminal device based on subscription data of the power consumption parameter of the terminal device and the expected value of the power consumption parameter of the terminal device; then the core network control plane device determines a candidate configured value of the power consumption parameter of the relay device based on subscription data of the power consumption parameter of the relay device and the expected value of the power consumption parameter of the relay device; and finally the core network control plane device determines the configured value of the power consumption parameter of the relay device and the configured value of the power consumption parameter of the terminal device based on the candidate configured value of the power consumption parameter of the relay device and the candidate configured value of the power consumption parameter of the terminal device.

Because the subscription data of the power consumption parameters of the relay device and the terminal device specifies usable values or ranges of the power consumption parameters that the relay device and the terminal device subscribe to, when the core network control plane device determines the configured value of the power consumption parameter of the relay device and the configured value of the power consumption parameter of the terminal device, the subscription data of the power consumption parameter of the terminal device and the subscription data of the power consumption parameter of the relay device further need to be considered, to further ensure that the determined configured value of the power consumption parameter of the relay device belongs to the subscription data of the power consumption parameter of the relay device, and ensure that the determined configured value of the power consumption parameter of the terminal device belongs to the subscription data of the power consumption parameter of the terminal device.

In a possible design, the power consumption parameter includes the PSM activation time, and both a configured value of PSM activation time of the relay device and a configured value of PSM activation time of the terminal device are a larger one of a candidate configured value of the PSM activation time of the relay device and a candidate configured value of the PSM activation time of the terminal device.

The foregoing design can ensure that the relay device does not enter a PSM earlier than the terminal device. Therefore, data transmission efficiency of the terminal device is ensured, while power consumption of the relay device is reduced.

In a possible design, the power consumption parameter includes the periodic location update timer duration, and both a configured value of periodic location update timer duration of the relay device and a configured value of periodic location update timer duration of the terminal device are a smaller one of a candidate configured value of the periodic location update timer duration of the relay device and a candidate configured value of the periodic location update timer duration of the terminal device.

The foregoing design can ensure that the relay device and the terminal device enter an active state simultaneously after both the relay device and the terminal device enter an idle state. This ensures that the relay device does not affect data transmission of the terminal device, and further ensures data transmission efficiency of the terminal device.

In a possible design, the power consumption parameter includes the eDRX cycle duration, and both a configured value of eDRX cycle duration of the relay device and a configured value of eDRX cycle duration of the terminal device are a smaller one of a candidate configured value of the eDRX cycle duration of the terminal device and a candidate configured value of the eDRX cycle duration of the relay device.

The foregoing design can satisfy requirements on latencies in receiving downlink data by the terminal device and the relay device, and ensure data transmission efficiency of the terminal device.

In a possible design, when the power consumption parameter includes the eDRX cycle duration, the core network control plane device may further determine data transmission configurations in eDRX cycles of the terminal device and the relay device in the following two manners.

Manner 1: The core network control plane device determines an activation time period and a data forwarding time period in an eDRX cycle of the relay device and a sleep time period and a data forwarding time period in an eDRX cycle of the terminal device, and sends the activation time period and the data forwarding time period in the eDRX cycle of the relay device and the sleep time period and the data forwarding time period in the eDRX cycle of the terminal device to the relay device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device.

Manner 2: The core network control plane device determines a sleep time period and a data forwarding time period in an eDRX cycle of the relay device and a sleep time period and a data forwarding time period in an eDRX cycle of the terminal device, and sends the sleep time period and the data forwarding time period in the eDRX cycle of the relay device and the sleep time period and the data forwarding time period in the eDRX cycle of the terminal device to the relay device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device.

In the foregoing two manners, the core network control plane device may determine the data transmission configurations in the eDRX cycles of the terminal device and the relay device, to further ensure data transmission efficiency of the terminal device. In addition, in the foregoing two manners, the data forwarding time period in the eDRX cycle of the terminal device is the same as the data forwarding time period in the eDRX cycle of the relay device. This can ensure that when the relay device receives downlink data of the terminal device from a network side (a core network user plane device), the downlink data can be forwarded to the terminal device in the data forwarding time period of the relay device.

In a possible design, the core network control plane device may determine the sleep time period in the eDRX cycle of the terminal device and the activation time period (or the sleep time period) in the eDRX cycle of the relay device by using the following method:

The core network control plane device determines the sleep time period in the eDRX cycle of the terminal device and the activation time period (or the sleep time period) in the eDRX cycle of the relay device based on power consumption status information of the terminal device and the relay device, where the power consumption status information includes at least one of the following: information about remaining power of a battery, a battery type, and a device type. Optionally, the information about the remaining power of the battery may be a percentage of the remaining power of the battery, a status of the remaining power of the battery, a value of the remaining power of the battery, or the like. The battery type may be whether the battery is chargeable, whether the battery can be used repeatedly, or the like. A type of the terminal device includes a mobile phone, a wearable device, or the like.

In the foregoing design, the core network control plane device may determine the sleep time period in the eDRX cycle of the terminal device and the activation time period (or the sleep time period) in the eDRX cycle of the relay device based on the power consumption status information of the terminal device and the relay device. Therefore, power of the battery of the terminal device can be utilized properly, and utilization of the battery is improved.

In a possible design, the core network control plane device may determine the data forwarding time periods in the eDRX cycles of the terminal device and the relay device by using the following method:

The core network control plane device determines the data forwarding time period in the eDRX cycle of the terminal device based on service feature parameters of the terminal device and the relay device, where the service feature parameters include at least one of the following: communication duration and communication data amount information (for example, information such as a size of a communication data packet and a quantity of data packets).

In the foregoing design, the core network control plane device may determine the data forwarding time periods in the eDRX cycles of the terminal device and the relay device based on the service feature parameters of the terminal device and the relay device. Therefore, the data forwarding time periods can be utilized properly, and resource utilization is improved.

According to a second aspect, an embodiment of this application provides a method for configuring a power consumption parameter, where the method includes: sending, by a terminal device, an expected value of a power consumption parameter to a relay device; and after receiving a configured value of the power consumption parameter of the terminal device from the relay device, setting, by the terminal device, the power consumption parameter of the terminal device based on the configured value, or releasing a connection between the terminal device and the relay device.

In the foregoing method, the terminal device may send the expected value of the power consumption parameter to a core network control plane device through the relay device, so that when the core network control plane device determines a configured value of a power consumption parameter of the relay device and the configured value of the power consumption parameter of the terminal device, the expected value of the power consumption parameter of the terminal device and an expected value of the power consumption parameter of the relay device are considered. This can not only reduce power consumption of the terminal device, but also avoid data transmission failure caused by sending data to a network side by the terminal device through the relay device when the relay device is in a sleep state, and ensure data transmission efficiency of the terminal device.

In a possible design, the power consumption parameter includes at least one of power saving mode PSM activation time, periodic location update timer duration, and extended discontinuous reception eDRX cycle duration.

The foregoing design can improve diversity of configuring the power consumption parameter of the terminal device by the core network control plane device.

In a possible design, when the power consumption parameter includes the eDRX cycle duration, the terminal device may further receive a sleep time period and a data forwarding time period in an eDRX cycle of the terminal device from the relay device.

In the foregoing design, the terminal device may determine a data transmission configuration in the eDRX cycle of the terminal device, to further ensure data transmission efficiency of the terminal device.

According to a third aspect, an embodiment of this application further provides a method for configuring a power consumption parameter, where the method includes: receiving, by a relay device, an expected value of a power consumption parameter of a terminal device, and then sending the expected value of the power consumption parameter of the terminal device and an expected value of the power consumption parameter of the relay device to a core network control plane device; and after receiving a configured value of the power consumption parameter of the relay device and a configured value of the power consumption parameter of the terminal device from the core network control plane device, sending, by the relay device, the configured value of the power consumption parameter of the terminal device to the terminal device.

In the foregoing method, the relay device may send the expected value of the power consumption parameter of the relay device and the expected value of the power consumption parameter of the terminal device to the core network control plane device, so that when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. This can not only reduce power consumption of the relay device and the terminal device, but also avoid data transmission failure caused by sending data to a network side by the terminal device through the relay device when the relay device is in a sleep state, and ensure data transmission efficiency of the terminal device.

In a possible design, the power consumption parameter includes at least one of power saving mode PSM activation time, periodic location update timer duration, and extended discontinuous reception eDRX cycle duration.

The foregoing design can improve diversity of configuring the power consumption parameters of the terminal device and the relay device by the core network control plane device.

In a possible design, when the power consumption parameter includes the eDRX cycle duration, the relay device may further receive an activation time period and a data forwarding time period in an eDRX cycle of the relay device or a sleep time period and a data forwarding time period in an eDRX cycle of the relay device and a sleep time period and a data forwarding time period in an eDRX cycle of the terminal device from the core network control plane device, where the data forwarding time period in the eDRX cycle of the terminal device is the same as the data forwarding time period in the eDRX cycle of the relay device; and then the relay device sends the sleep time period and the data forwarding time period in the eDRX cycle of the terminal device to the terminal device.

In the foregoing design, the terminal device and the relay device may determine data transmission configurations in their eDRX cycles respectively, to further ensure data transmission efficiency of the terminal device.

According to a fourth aspect, an embodiment of this application further provides a method for configuring a power consumption parameter, where the method includes: receiving, by a core network control plane device, expected values of extended discontinuous reception eDRX cycle duration of N terminal devices; then determining a configured value of the eDRX cycle duration based on the expected values of the eDRX cycle duration of the N terminal devices; and sending the configured value of the eDRX cycle duration to the N terminal devices.

In the foregoing method, in a scenario in which a plurality of terminal devices using an eDRX technology exist and the plurality of terminal devices can all access a network in two manners, the core network control plane device may configure eDRX cycle duration, to optimize power consumption of the plurality of terminal devices, and ensure data transmission efficiency of the plurality of terminal devices.

In a possible design, the configured value of the eDRX cycle duration is a smallest one of the expected values of the eDRX cycle duration of the N terminal devices.

The foregoing design can satisfy requirements on latencies in receiving downlink data by the N terminal devices, and ensure data transmission efficiency of the N terminal devices.

In a possible design, the core network control plane device may determine the configured value of the eDRX cycle duration based on the expected values of the eDRX cycle duration of the N terminal devices by using the following method:

The core network control plane device first determines candidate configured values of the eDRX cycle duration of the N terminal devices based on subscription data of the eDRX cycle duration of the N terminal devices and the expected values of the eDRX cycle duration of the N terminal devices, and then determines the configured value of the eDRX cycle duration based on the candidate configured values of the eDRX cycle duration of the N terminal devices.

In the foregoing design, when the core network control plane device determines the eDRX cycle duration, the subscription data of the eDRX cycle duration of the N terminal devices is further considered, to ensure that the determined configured value of the eDRX cycle duration satisfies a requirement of the subscription data of the eDRX cycle duration of the N terminal devices.

In a possible design, the configured value of the eDRX cycle duration is a smallest one of the candidate configured values of the eDRX cycle duration of the N terminal devices.

In the foregoing design, the configured value of the eDRX cycle duration can satisfy requirements on latencies in receiving downlink data by the N terminal devices, and ensure data transmission efficiency of the N terminal devices.

In a possible design, after the core network control plane device determines the configured value of the eDRX cycle duration, the core network control plane device may further determine activation time periods, sleep time periods, and data forwarding time periods in eDRX cycles of the N terminal devices, and send the activation time periods, the sleep time periods, and the data forwarding time periods in the eDRX cycles of the N terminal devices to the N terminal devices, where a data forwarding time period in an eDRX cycle of each of the N terminal devices is the same as a data forwarding time period in an eDRX cycle of at least one other terminal device of the N terminal devices, and duration of the eDRX cycles of the N terminal devices is the configured value of the eDRX cycle duration.

In the foregoing design, the data forwarding time period in the eDRX cycle of each of the N terminal devices is the same as the data forwarding time period in the eDRX cycle of at least one other terminal device of the N terminal devices. This can ensure that a plurality of terminal devices having a same data forwarding time period in eDRX cycles may perform downlink data forwarding. To be specific, data received by a terminal device in an activation time period in the plurality of terminal devices may be forwarded to another terminal device in the data forwarding time period.

In a possible design, no intersection set exists between activation time periods in eDRX cycles of any two of the N terminal devices.

In the foregoing design, when a terminal device in an eDRX cycle is in an activation time period, all other terminal devices are in sleep time periods. This ensures that when a core network user plane network element needs to send downlink data to the N terminal devices, the downlink data may be sent to the terminal device in the activation time period in the N terminal devices. This can ensure that downlink data in the core network user plane device can be delivered to a terminal device in time, prevent the core network user plane device from buffering excessive downlink data, and further maximally reduce power consumption of the N terminal devices.

In a possible design, the core network control plane device may determine the activation time periods in the eDRX cycles of the N terminal devices by using the following method:

The core network control plane device determines the activation time periods in the eDRX cycles of the N terminal devices based on power consumption status information of the N terminal devices, where the power consumption status information includes at least one of the following: information about remaining power of a battery, a battery type, and a device type. The information about the remaining power of the battery may be a percentage of the remaining power of the battery, a status of the remaining power of the battery, a value of the remaining power of the battery, or the like. The battery type may be whether the battery is chargeable, whether the battery can be used repeatedly, or the like. A type of the terminal device includes a mobile phone, a wearable device, or the like.

In the foregoing design, the core network control plane device may determine an activation time period in the eDRX cycle of each terminal device based on power consumption status information of each terminal device. Therefore, power of a battery of each terminal device can be utilized properly, and utilization of the battery is improved.

In a possible design, the core network control plane device may determine the data forwarding time periods in the eDRX cycles of the N terminal devices by using the following method:

The core network control plane device determines the data forwarding time periods in the eDRX cycles of the N terminal devices based on service feature parameters of the N terminal devices, where the service feature parameters include at least one of the following: communication duration and communication data amount information (for example, information such as a size of a communication data packet and a quantity of data packets).

In the foregoing design, the core network control plane device may determine a data forwarding time period in an eDRX cycle of each terminal device based on a service feature parameter of each terminal device. Therefore, data forwarding time can be utilized properly, and resource utilization is improved.

In a possible design, after the core network control plane device sends the activation time periods, the sleep time periods, and the data forwarding time periods of the N terminal devices to the N terminal devices, the core network control plane device may transmit downlink data of a target terminal device of the N terminal devices by using the following method:

The core network control plane device receives a downlink data notification message sent by the core network user plane device, to determine that the core network user plane device has received the downlink data of the target terminal device; when the target terminal device is in a sleep time period, the core network control plane device determines a forwarding terminal device from the N terminal devices based on the activation time periods, the sleep time periods, and the data forwarding time periods of the N terminal devices, where the forwarding terminal device is in an activation time period, and a data forwarding time period of the forwarding terminal device is the same as a data forwarding time period of the target terminal device; and then the core network control plane device sends a paging message to the forwarding terminal device, and after receiving a paging response from the forwarding terminal device, instructs the core network user plane device to send the downlink data of the target terminal device to the forwarding terminal device. The downlink data notification message is used to notify the core network control plane device that the core network user plane device has received the downlink data of the target terminal device, and the target terminal device is one of the N terminal devices.

In the foregoing design, when the core network user plane device has downlink data to be sent to the target terminal device, the core network control plane device may determine, based on an overlapping relationship between the data forwarding time periods in the eDRX cycles of the N terminal devices, the forwarding terminal device that is in the activation time period and can be paged, so that the core network user plane device can first send the downlink data to the forwarding terminal device. Therefore, in data forwarding time periods in eDRX cycles of the forwarding terminal device and the target terminal device, the forwarding terminal device sends the downlink data to the target terminal device. This can ensure that the downlink data in the core network user plane device can be delivered to the terminal device in time, and prevent the core network user plane device from buffering excessive downlink data.

According to a fifth aspect, an embodiment of this application further provides a method for configuring a power consumption parameter, where the method includes:

receiving, by a radio access network RAN device, extended discontinuous reception eDRX deactivation information sent by a core network control plane device; and broadcasting a system broadcast message based on the eDRX deactivation information, where the system broadcast message indicates that an eDRX function of the RAN device is not enabled, so that a terminal device and a relay device accessing the RAN device do not enable or stop the eDRX function either.

In the foregoing method, after fault recovery of the core network control plane device in a mobile communications system, the RAN device sends the system broadcast message to instruct the relay device and the terminal device accessing the RAN device not to enable the eDRX function. This prevents the relay device and the terminal device in the mobile communications system from continuing to enable the eDRX function, and avoids impact on service processing of the terminal device.

According to a sixth aspect, an embodiment of this application further provides a method for configuring a power consumption parameter, where the method includes:

receiving, by a radio access network RAN device, a paging message sent by a core network control plane device and carrying an international mobile subscriber identity IMSI of a terminal device; and if an extended discontinuous reception eDRX function of the RAN device is enabled, broadcasting, by the RAN device, a system broadcast message, where the system broadcast message indicates that the eDRX function of the RAN device is not enabled.

In the foregoing method, after fault recovery of the core network control plane device in a mobile communications system, the RAN device sends the system broadcast message to instruct a relay device and the terminal device accessing the RAN device not to enable the eDRX function. This prevents the relay device and the terminal device in the mobile communications system from continuing to enable the eDRX function, and avoids impact on service processing of the terminal device.

According to a seventh aspect, an embodiment of this application further provides a core network control plane device, where the core network control plane device has a function for implementing an action of the core network control plane device in the foregoing method embodiment. The function may be implemented by hardware, or may be implemented by corresponding software executed by hardware. The hardware or software includes one or more modules corresponding to the foregoing function.

In a possible design, a structure of the core network control plane device includes a receiving unit, a processing unit, and a sending unit. The units may perform corresponding functions in the foregoing method embodiment. For details, refer to detailed descriptions in the method embodiment. Details are not described herein.

In a possible design, a structure of the core network control plane device includes a communications interface, a processor, and a memory, where the communications interface is configured to communicate and interact with another device such as a relay device or a terminal device, and the processor is configured to support the core network control plane device in performing corresponding functions in the foregoing method. The memory is coupled to the processor, and the memory stores a program instruction and data required by the core network control plane device.

According to an eighth aspect, an embodiment of this application further provides a terminal device, where the terminal device has a function for implementing an action of the terminal device in the foregoing method embodiment. The function may be implemented by hardware, or may be implemented by corresponding software executed by hardware. The hardware or software includes one or more modules corresponding to the foregoing function.

In a possible design, a structure of the terminal device includes a receiving unit, a processing unit, and a sending unit. The units may perform corresponding functions in the foregoing method embodiment. For details, refer to detailed descriptions in the method embodiment. Details are not described herein.

In a possible design, a structure of the terminal device includes a transceiver, a processor, and a memory, where the transceiver is configured to communicate and interact with a relay device, and the processor is configured to support the terminal device in performing corresponding functions in the foregoing method. The memory is coupled to the processor, and the memory stores a program instruction and data required by the terminal device.

According to a ninth aspect, an embodiment of this application further provides a relay device, where the relay device has a function for implementing an action of the relay device in the foregoing method embodiment. The function may be implemented by hardware, or may be implemented by corresponding software executed by hardware. The hardware or software includes one or more modules corresponding to the foregoing function.

In a possible design, a structure of the relay device includes a receiving unit and a sending unit. The units may perform corresponding functions in the foregoing method embodiment. For details, refer to detailed descriptions in the method embodiment. Details are not described herein.

In a possible design, a structure of the relay device includes a transceiver, a processor, and a memory, where the transceiver is configured to communicate and interact with a terminal device and a core network control plane device, and the processor is configured to support the relay device in performing corresponding functions in the foregoing method. The memory is coupled to the processor, and the memory stores a program instruction and data required by the relay device.

According to a tenth aspect, an embodiment of this application further provides a RAN device, where the RAN device has a function for implementing an action of the RAN device in the foregoing method embodiment. The function may be implemented by hardware, or may be implemented by corresponding software executed by hardware. The hardware or software includes one or more modules corresponding to the foregoing function.

In a possible design, a structure of the RAN device includes a receiving unit and a processing unit. The units may perform corresponding functions in the foregoing method embodiment. For details, refer to detailed descriptions in the method embodiment. Details are not described herein.

In a possible design, a structure of the RAN device includes a transceiver, a processor, and a memory, where the transceiver is configured to communicate and interact with another device, and the processor is configured to support the RAN device in performing corresponding functions in the foregoing method. The memory is coupled to the processor, and the memory stores a program instruction and data required by the RAN device.

According to an eleventh aspect, an embodiment of this application further provides a mobile communications system, where the mobile communications system includes a terminal device, a relay device, and a core network control plane network device.

According to a twelfth aspect, an embodiment of this application further provides a computer storage medium, where the storage medium stores a software program, and when the software program is read and executed by one or more processors, the method provided in any design of any aspect can be implemented.

In the solutions provided by the embodiments of this application, when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. The expected value of the power consumption parameter of the terminal device may reflect a data transmission requirement and a power consumption reduction requirement of the terminal device, and the expected value of the power consumption parameter of the relay device may reflect a data transmission requirement and a power consumption reduction requirement of the relay device. Therefore, the configured value of the power consumption parameter of the relay device satisfies the data transmission requirement of the terminal device, and ensures data transmission efficiency of the terminal device. In addition, the configured value of the power consumption parameter of the relay device and the configured value of the power consumption parameter of the terminal device also satisfy the power consumption reduction requirements of the relay device and the terminal device.

DESCRIPTION OF EMBODIMENTS

Figure 1:
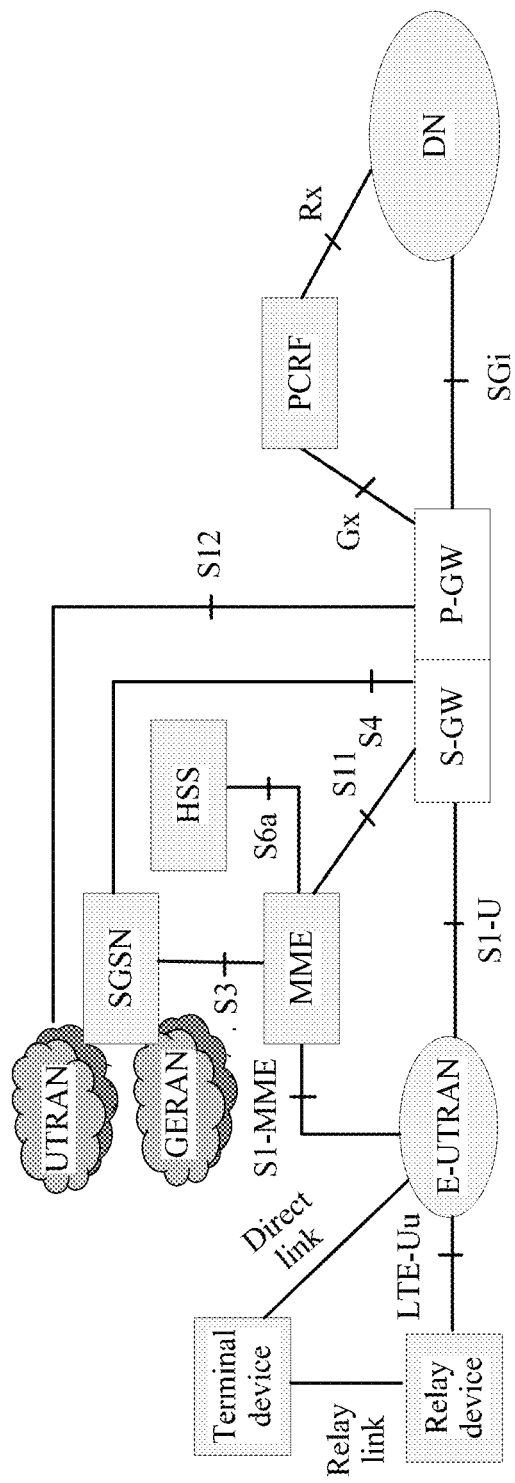
FIG. 1 is an architectural diagram of a mobile communications system according to an embodiment of this application.

This application provides a method and an apparatus for configuring a power consumption parameter, to reduce power consumption of a terminal device and a relay device while ensuring data transmission efficiency of the terminal device in a scenario in which the terminal device accesses a network by using the relay device.

A method for configuring a power consumption parameter according to an embodiment of this application may be applied to a scenario in which a terminal device accesses a network by using a relay device. The method includes: a relay device sends an expected value of a power consumption parameter of a terminal device and an expected value of a power consumption parameter of the relay device to a core network control plane device; the core network control plane device may determine a configured value of the power consumption parameter of the relay device and a configured value of the power consumption parameter of the terminal device based on the expected value of the power consumption parameter of the relay device and the expected value of the power consumption parameter of the terminal device; the core network control plane device sends the configured value of the power consumption parameter of the relay device and the configured value of the power consumption parameter of the terminal device to the relay device; and the relay device sends the configured value of the power consumption parameter of the terminal device to the terminal device.

Based on the foregoing method, when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. The expected value of the power consumption parameter of the terminal device may reflect a data transmission requirement and a power consumption reduction requirement of the terminal device, and the expected value of the power consumption parameter of the relay device may reflect a data transmission requirement and a power consumption reduction requirement of the relay device. Therefore, the configured value of the power consumption parameter of the relay device satisfies the data transmission requirement of the terminal device, and ensures data transmission efficiency of the terminal device. In addition, the configured value of the power consumption parameter of the relay device and the configured value of the power consumption parameter of the terminal device also satisfy the power consumption reduction requirements of the relay device and the terminal device.

The following describes some terms of the embodiments of this application to help a person skilled in the art have a better understanding.

(1) A core network is responsible for connecting a terminal device to different networks based on a call request or data request sent by the terminal device by using an access network, and responsible for services such as charging and mobility management. The core network may be a core network in various networking forms of mobile communications systems. This is not limited in this application. For example, the core network may be a core network in a 2nd Generation (2G) mobile communications system, for example, a core network in a global system for mobile communications (GSM), or a core network in a general packet radio service (GPRS) system; or the core network may be a core network in a 3rd generation (3G) mobile communications system, for example, a core network in a universal mobile telecommunications system (UMTS), or may be a core network in a 4th generation (4G) mobile communications system, for example, an evolved packet core network (EPC), or another core network evolved based on a network architecture of an EPC; or may be a core network in a 5th generation (5G) or various future mobile communications networks.

(2) A core network control plane device is a device responsible for implementing control management functions such as session management, mobility management (MM), or path management, for example, a mobility management entity (MME), a serving gateway (S-GW), a serving GPRS support node (SGSN), or a control plane function (CPF) entity.

(3) A core network user plane device is a device responsible for forwarding user plane data in the core network, for example, an S-GW, a packet data network gateway (P-GW), a system architecture evolution gateway (SAE-GW), or a user plane function (UPF) entity. This is not limited in this application.

(4) A radio access network (RAN) device may also be referred to as an access network device.

First, a RAN may be an access network in various mobile communications systems, for example, the GSM, a universal terrestrial radio access network (UTRAN), or an evolved universal terrestrial radio access network (E-UTRAN).

The RAN device includes but is not limited to a base station, an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), an access point (AP), or the like.

(5) A terminal device, also referred to as user equipment (UE), is a device providing voice and/or data connectivity for a user, for example, a handheld device (for example, a mobile phone or a tablet computer) having a wireless connection function, an in-vehicle device, a wearable device (for example, a smart band, a smartwatch, or a pair of smart glasses), a computing device, a mobile station (MS), another processing device connected to a wireless modem, or a mobile terminal that communicates with one or more core networks by using a radio access network.

The terminal device may access a network in at least two manners: (a) accessing the network by directly using a RAN device; and (b) accessing the network by using a relay device.

(6) A relay device is a device that may serve as a relay node to connect a terminal device to the network. The relay device may be a terminal device, for example, a mobile phone connected to a plurality of wearable devices, or may be a small station.

(7) A power consumption parameter includes at least one of PSM activation time, periodic location update timer duration, and eDRX cycle duration.

(8) An expected value of a power consumption parameter is a specific value or range requested by the relay device or the terminal device from the core network control plane device for the power consumption parameter. For example, the expected value of the power consumption parameter of the relay device may be determined by the relay device based on a data transmission requirement and a power consumption reduction requirement of the relay device.

(9) A configured value of the power consumption parameter is a value of the power consumption parameter configured by the core network control plane device for the relay device or the terminal device.

(10) Subscription data of the power consumption parameter is a value or range of the power consumption parameter that the relay device or the terminal device subscribes to. Subscription data of the power consumption parameters of the relay device and the terminal device may be stored in the core network control plane device, or another device in the core network, for example, stored in a home subscriber server (HSS).

(11) "A plurality of" refers to two or more than two.

(12) The term "and/or" describes an association relationship between associated objects, and indicates that three relationships may exist. For example, A and/or B may represent the following three cases: Only A exists, both A and B exist, and only B exists. The character "/" generally indicates an "or" relationship between the associated objects.

The following further describes in detail the embodiments of this application with reference to accompanying drawings.

FIG. 1 shows an architecture of a mobile communications system. The system is an evolved packet system (EPS), and includes two parts: a radio access network and an EPC.

The radio access network may be an E-UTRAN. It provides services related to radio access for a terminal device, and implements a radio physical layer function, and functions of resource scheduling and radio resource management, radio access control, and mobility management. The radio access network includes at least one RAN device, such as an eNodeB. The RAN device is connected to an S-GW by using a user plane interface S1-U, to implement transmission of user data. The RAN device is connected to an MME by using a control plane interface S1-MME, to implement functions such as radio access bearer control.

The EPC mainly includes the MME, the S-GW, a P-GW, an HSS, and a policy and charging rules function (PCRF), which are described in detail hereinafter.

The MME is mainly responsible for all control plane functions of session management, including functions such as non-access stratum (NAS) signaling, security, tracking area management, and bearer management.

The HSS is configured to store subscription information of each terminal device.

The S-GW is used for data transmission, forwarding, route switching, and the like for the terminal device, and serves as a local mobility anchor when the terminal device is handed over between RAN devices.

The P-GW serves as an anchor connected to a packet data network (PDN), and is responsible for assigning an Internet Protocol (IP) address to the terminal device, filtering a data packet of the terminal device, performing rate control, generating charging information, and the like.

The S-GW and the P-GW may be deployed on a same physical device, or separately deployed on different physical devices. This is not limited in this embodiment of this application.

The PCRF provides a policy and charging rule.

As shown in FIG. 1, a relay device accesses a network by using a RAN device in the E-UTRAN.

The terminal device may access the network in two manners. The first manner is: accessing the E-UTRAN by using a direct link. The second manner is: connecting to the relay device by using a relay link, and accessing the E-UTRAN by using the relay device.

It should be noted that, the EPS shown in FIG. 1 is merely one mobile communications system in this embodiment of this application. This embodiment of this application may be further applied to a 5G communications system, and another mobile communications system such as a GSM, a GPRS system, or a UMTS.

Figure 2:
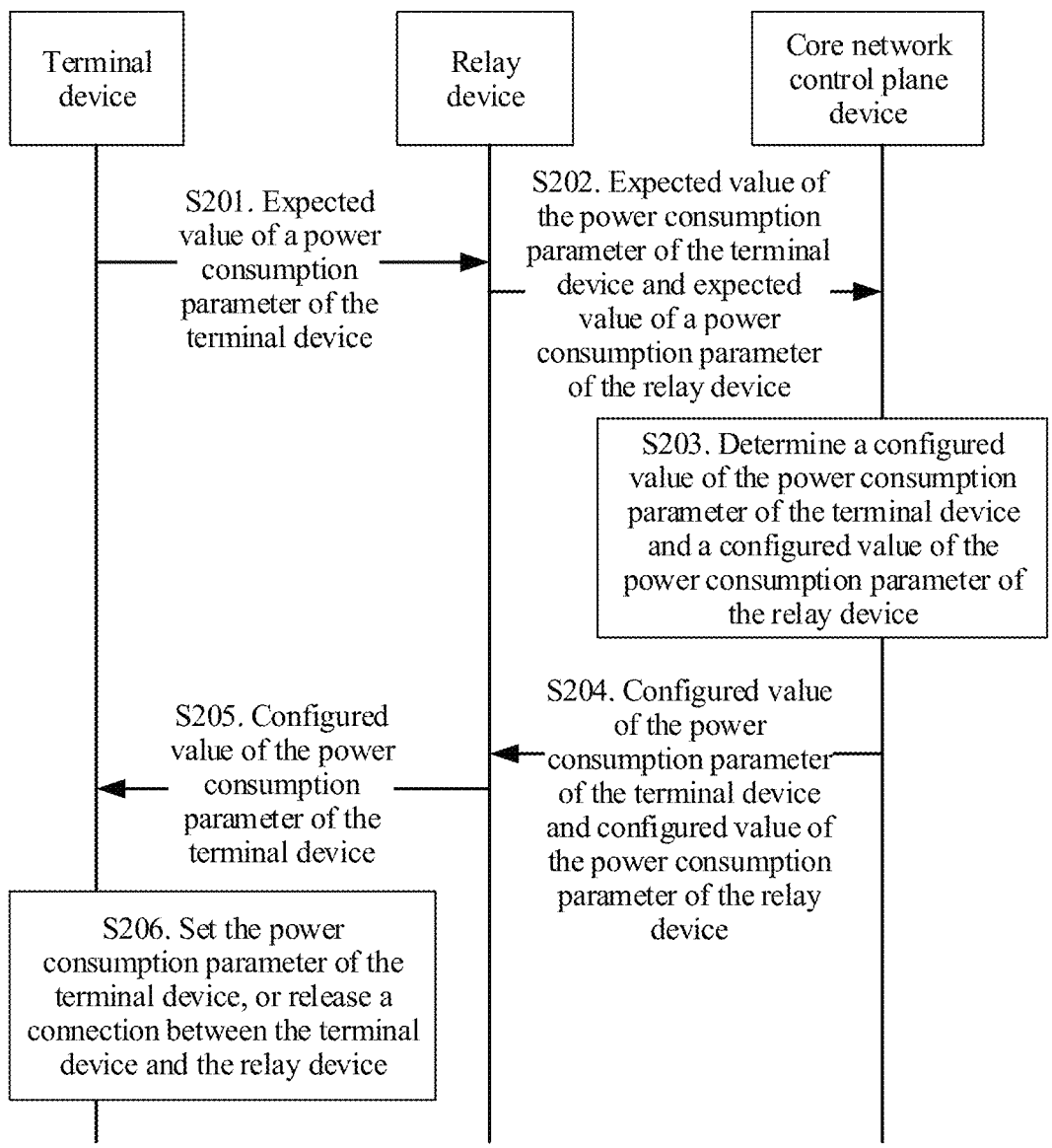
FIG. 2 is a flowchart of a method for configuring a power consumption parameter according to an embodiment of this application.

As shown in FIG. 2, an embodiment of this application provides a method for configuring a power consumption parameter. The following describes the method.

S201. A terminal device sends an expected value of a power consumption parameter to a relay device.

Correspondingly, the relay device receives the expected value of the power consumption parameter of the terminal device.

The terminal device establishes a connection to the relay device, and accesses a RAN by using the relay device. The terminal device may be located near the relay device.

Optionally, the terminal device may establish the connection to the relay device by using various communications technologies, for example, a wireless fidelity (Wi-Fi) technology, a Bluetooth technology, an Ethernet technology, a zigbee technology, a universal plug and play (UPnP) technology, a digital living network alliance (DLNA) technology, and the like. This is not limited in this embodiment of this application.

The power consumption parameter may include at least one of PSM activation time, periodic location update timer duration, and eDRX cycle duration.

When the terminal device and/or the relay device are/is in an active state, data may be transmitted to ensure service performance, but when the terminal device and/or the relay device are/is in a sleep state, data transmission is not allowed, so that power consumption can be reduced.

The terminal device is used as an example for describing the PSM activation time. When the terminal device enters an idle state, a timer is started, where duration of the timer is set to a configured value of the PSM activation time. After the timer expires, the terminal device enters a PSM from the idle state. In this case, the terminal device is in the sleep state, is disconnected from the relay device, and does not monitor a paging message, to reduce power consumption. When the terminal device has uplink data or signaling to be transmitted to a network side, the terminal device exits the PSM, and enters the active state.

The terminal device is still used as an example for describing the periodic location update timer duration. When the terminal device enters the idle state, a periodic location update timer is started, where duration of the periodic location update timer is set to a configured value of the periodic location update timer duration. After the periodic location update timer expires, the terminal device may switch from the idle state to the active state. Usually, a value of periodic location update timer duration of a terminal device using a PSM technology is greater than a value of the foregoing PSM activation time. Therefore, when the terminal device enters the idle state, the terminal device starts the timer that is set to the configured value of the PSM activation time and starts the periodic location update timer, and then enters the PSM. After the timer that is set to the configured value of the PSM activation time expires, the terminal device enters the PSM from the idle state; and after the periodic location update timer expires, the terminal device switches from the PSM to the active state.

The terminal device is still used as an example for describing the eDRX cycle duration. In the communications field, a terminal device using an eDRX technology continuously transmits data based on an eDRX cycle. Duration of the eDRX cycle is set to a configured value of the eDRX cycle duration. In a specific time period (the terminal device is in the active state) of each eDRX cycle, the terminal device can transmit data, but in another specific time period (the terminal device is in the sleep state) of each eDRX cycle, the terminal device cannot transmit data.

It should be noted that, the terminal device may include all or some terminal devices that access the RAN by using the relay device. Specifically, the terminal device may be one or more terminal devices. This is not limited herein.

S202. The relay device sends the expected value of the power consumption parameter of the terminal device and an expected value of the power consumption parameter of the relay device to a core network control plane device.

Correspondingly, the core network control plane device receives the expected value of the power consumption parameter of the relay device and the expected value of the power consumption parameter of the terminal device.

In an LTE system, the core network control plane device may be an MME. In a GSM or UMTS system, the core network control plane device may be an SGSN. In a 5G system, the core network control plane device may be a CPF entity.

In addition, the expected value of the power consumption parameter of the relay device may reflect a data transmission requirement and a power consumption reduction requirement of the relay device, and the expected value of the power consumption parameter of the terminal device may reflect a data transmission requirement and a power consumption reduction requirement of the terminal device.

Optionally, when performing S202, the relay device may add the expected value of the power consumption parameter of the relay device and the expected value of the power consumption parameter of the terminal device to an attach request message or a location update request message, and send the message to the core network control plane device.

S203. The core network control plane device determines a configured value of the power consumption parameter of the relay device and a configured value of the power consumption parameter of the terminal device based on the expected value of the power consumption parameter of the relay device and the expected value of the power consumption parameter of the terminal device.

The configured value of the power consumption parameter of the relay device is used to configure the power consumption parameter of the relay device, to reduce power consumption of the relay device. The configured value of the power consumption parameter of the terminal device may be the same as or different from the configured value of the power consumption parameter of the relay device, and is specifically used to configure the power consumption parameter of the terminal device, to reduce power consumption of the terminal device.

In this embodiment of this application, the terminal device implements data transmission with a network by using the relay device. To ensure data transmission efficiency of the terminal device, when the terminal device is to transmit data, the relay device can transmit data; and when all terminal devices connected to the relay device are not allowed to transmit data, the relay device may be not allowed to transmit data. To be specific, the configured value of the power consumption parameter of the relay device refers to the data transmission requirement and the power consumption reduction requirement of the terminal device connected to the relay device.

S204. The core network control plane device sends the configured value of the power consumption parameter of the relay device and the configured value of the power consumption parameter of the terminal device to the relay device.

Correspondingly, the relay device receives the configured value of the power consumption parameter of the relay device and the configured value of the power consumption parameter of the terminal device from the core network control plane device.

The configured value of the power consumption parameter of the relay device and the configured value of the power consumption parameter of the terminal device may be sent to the relay device simultaneously. For example, the configured value of the power consumption parameter of the relay device and the configured value of the power consumption parameter of the terminal device are carried in an attach accept message or a location update accept message and sent to the relay device.

Obviously, the configured value of the power consumption parameter of the relay device and the configured value of the power consumption parameter of the terminal device may also be sent to the relay device separately at different times. This is not limited in this application.

S205. The relay device sends the configured value of the power consumption parameter of the terminal device to the terminal device.

Correspondingly, the terminal device receives the configured value of the power consumption parameter of the terminal device from the relay device.

In the method for configuring a power consumption parameter according to the foregoing embodiment, both the configured value of the power consumption parameter of the relay device and the configured value of the power consumption parameter of the terminal device that accesses the RAN by using the relay device are determined based on the expected value of the power consumption parameter of the terminal device and the expected value of the power consumption parameter of the relay device. This avoids data transmission failure caused by sending data to the network side by the terminal device through the relay device when the relay device is in the sleep state. Therefore, the method not only reduces power consumption of the relay device and the terminal device, but also ensures data transmission efficiency of the terminal device.

Optionally, the method further includes S206: The terminal device receives the configured value of the power consumption parameter from the relay device, and sets the power consumption parameter of the terminal device based on the configured value, or releases a connection between the terminal device and the relay device.

For example, when the configured value of the power consumption parameter that is received by the terminal device does not satisfy its own requirement or service requirement, or the configured value is different from the expected value of the power consumption parameter of the terminal device, or a difference between the configured value and the expected value is greater than or equal to a specified threshold, the terminal device may be disconnected from the relay device. Further, the terminal device may reselect another relay device, and establish a connection to the reselected relay device.

Further, if the terminal device is disconnected from the relay device, the method may further include: the relay device triggers the core network control plane device to reconfigure the power consumption parameter of the relay device and the power consumption parameter of the terminal device connected to the relay device. For example, the relay device may notify the core network control plane device of the terminal device that is disconnected, and the core network control plane device excludes the expected value of the power consumption parameter of the terminal device. For a specific process, refer to S203. Details are not described again herein.

Further, if the terminal device is disconnected from the relay device, the method may further include: the relay device may instruct the terminal device to send the expected value of the power consumption parameter and perform S201 again.

Optionally, that the terminal device sets the power consumption parameter of the terminal device based on the configured value in S206 specifically includes:

after receiving the configured value of the power consumption parameter of the terminal device, the terminal device may directly set the power consumption parameter of the terminal device based on the configured value; or when the terminal device determines that the received configured value of the power consumption parameter of the terminal device satisfies its own requirement or service requirement, or the configured value is the same as the expected value of the power consumption parameter of the terminal device, or the difference between the configured value and the expected value is less than the specified threshold, the terminal device sets the power consumption parameter of the terminal device based on the configured value.

Optionally, the method further includes the following step:

After receiving the configured value of the power consumption parameter of the relay device, the relay device sets the power consumption parameter of the relay device based on the received configured value of the power consumption parameter.

For the foregoing step, refer to the description about setting the power consumption parameter of the terminal device based on the configured value in S206. Details are not described again.

Optionally, in a first implementation scenario of the foregoing embodiment, S203 includes:

the core network control plane device determines the configured value of the power consumption parameter of the terminal device based on the expected value of the power consumption parameter of the terminal device; and the core network control plane device determines the configured value of the power consumption parameter of the relay device based on the expected value of the power consumption parameter of the relay device and the configured value of the power consumption parameter of the terminal device.

In this implementation scenario, the core network control plane device first configures the power consumption parameter of the terminal device based on the expected value of the power consumption parameter of the terminal device, so that the configured value of the power consumption parameter of the terminal device satisfies the data transmission requirement and the power consumption reduction requirement of the terminal device. Then the core network control plane device determines the configured value of the power consumption parameter of the relay device based on the configured value of the power consumption parameter of the terminal device and the expected value of the power consumption parameter of the relay device, so that the configured value of the power consumption parameter of the relay device ensures data transmission efficiency of the terminal device; in addition, the configured value of the power consumption parameter of the relay device also satisfies the power consumption reduction requirement of the relay device.

In a first possible design of the foregoing implementation scenario, when a quantity of such terminal devices is greater than 1, the power consumption parameter includes the PSM activation time, a configured value of PSM activation time of the relay device is greater than or equal to a largest one of configured values of PSM activation time of the terminal devices, and the configured value of the PSM activation time of the relay device is greater than or equal to an expected value of the PSM activation time of the relay device.

Because the configured value of the PSM activation time of the relay device is greater than or equal to the largest one of the configured values of the PSM activation time of the terminal devices, when the terminal devices include a terminal device that does not enter the PSM, the relay device does not enter the PSM either. To be specific, the relay device does not enter the PSM earlier than the terminal device. Therefore, data transmission efficiency of the terminal device is ensured, while power consumption of the relay device is reduced.

After performing S203, the core network control plane device sends the configured value of the power consumption parameter of the relay device and the configured value of the power consumption parameter of the terminal device to the relay device, and the relay device sends the configured value of the power consumption parameter of the terminal device to the terminal device. Because a distance between the relay device and the terminal device is relatively short, it may be considered that the relay device and the terminal device receive the configured values of their power consumption parameters simultaneously. In addition, because the relay device and the terminal device receive the configured values of their power consumption parameters simultaneously, that is, enter the idle state from a connected state simultaneously, it may be understood that the relay device and the terminal device start timers for entering PSM simultaneously.

In a second possible design of the foregoing implementation scenario, when a quantity of such terminal devices is greater than 1, the power consumption parameter includes the periodic location update timer duration, a configured value of periodic location update timer duration of the relay device is less than or equal to a smallest one of configured values of periodic location update timer duration of the terminal devices, and the configured value of the periodic location update timer duration of the relay device is less than or equal to an expected value of the periodic location update timer duration of the relay device. The design can ensure that after both the relay device and the terminal device enter the idle state, the relay device can enter the active state earlier than the terminal device. To be specific, the relay device enters the active state when or before the terminal device enters the active state. This ensures that the relay device does not affect data transmission of the terminal device, and further ensures data transmission efficiency of the terminal device.

Using the terminal device as an example, when the terminal device enters the idle state, the terminal device starts the periodic location update timer; and after the periodic location update timer expires, the terminal device enters the active state, and in this case, the terminal device can transmit data.

Optionally, when the terminal device uses a PSM power consumption optimization manner, before the periodic location update timer expires, the terminal device may enter the PSM from the idle state; and after the periodic location update timer expires, the terminal device enters the active state from the PSM.

As can be known based on the description in the first design, in this embodiment of this application, because the relay device and the terminal device enter the idle state from the connected state simultaneously, the relay device and the terminal device start the periodic location update timers simultaneously.

Optionally, when the core network control plane device performs S203, subscription data of the power consumption parameter of the terminal device and subscription data of the power consumption parameter of the relay device are further considered, to ensure that the configured value of the power consumption parameter of the relay device satisfies a requirement on the subscription data of the power consumption parameter of the relay device, and ensure that the configured value of the power consumption parameter of the terminal device satisfies a requirement on the subscription data of the power consumption parameter of the terminal device.

In an example, that the core network control plane device determines the configured value of the power consumption parameter of the terminal device based on the expected value of the power consumption parameter of the terminal device may include:

the core network control plane device determines the configured value of the power consumption parameter of the terminal device based on the subscription data of the power consumption parameter of the terminal device and the expected value of the power consumption parameter of the terminal device, where the configured value of the power consumption parameter of the terminal device belongs to the subscription data of the power consumption parameter of the terminal device.

In another example, that the core network control plane device determines the configured value of the power consumption parameter of the relay device based on the expected value of the power consumption parameter of the relay device and the configured value of the power consumption parameter of the terminal device may include:

the core network control plane device determines the configured value of the power consumption parameter of the relay device based on the subscription data of the power consumption parameter of the relay device, the expected value of the power consumption parameter of the relay device, and the configured value of the power consumption parameter of the terminal device, where the configured value of the power consumption parameter of the relay device belongs to the subscription data of the power consumption parameter of the relay device.

The subscription data of the power consumption parameter of the terminal device and the subscription data of the power consumption parameter of the relay device may be stored in the core network control plane device or an HSS.

For example, when the subscription data of the power consumption parameter of the terminal device and the subscription data of the power consumption parameter of the relay device are stored in the HSS, the core network control plane device may send a request message to obtain the subscription data of the power consumption parameter of the terminal device and the subscription data of the power consumption parameter of the relay device.

Optionally, that the core network control plane device determines the configured value of the power consumption parameter of the terminal device based on the subscription data of the power consumption parameter of the terminal device and the expected value of the power consumption parameter of the terminal device specifically includes the following process:

The core network control plane device determines whether the expected value belongs to the subscription data; and if the expected value belongs to the subscription data, the core network control plane device uses the expected value as the configured value (when the expected value is a specific value), or selects a largest value or a smallest value from the expected value as the configured value (when the expected value is a range). For example, when the power consumption configuration parameter is the PSM activation time, the largest value is selected; or when the power consumption configuration parameter is the periodic location update timer duration, the smallest value is selected. If the expected value does not belong to the subscription data, the core network control plane device selects a largest value or a smallest value from the subscription data as the configured value. A specific selection method is similar to the foregoing method for selecting the configured value from the expected value, and is not described again herein.

Because the expected value reflects the requirement of the terminal device, in the foregoing method, when the expected value belongs to the subscription data, the configured value is preferentially determined in the expected value. Therefore, the method can ensure that the requirement of the terminal device is satisfied as far as possible, while ensuring that the configured value of the power consumption parameter of the terminal device belongs to the subscription data of the power consumption parameter of the terminal device.

Optionally, when the core network control plane device determines that the expected value of the power consumption parameter of the relay device belongs to the subscription data of the power consumption parameter of the relay device and satisfies a condition for the configured value of the power consumption parameter of the relay device in the foregoing design, the core network control plane device uses the expected value of the power consumption parameter of the relay device as the configured value of the power consumption parameter of the relay device (when the expected value is a specific value), or selects a largest value or a smallest value from the expected value as the configured value (when the expected value is a range). For a specific process, refer to the description about determining the configured value of the power consumption parameter of the terminal device. Details are not described again herein.

Correspondingly, when the core network control plane device determines that the expected value of the power consumption parameter of the relay device does not belong to the subscription data of the power consumption parameter of the relay device, and/or that the expected value of the power consumption parameter of the relay device does not satisfy a condition for the configured value of the power consumption parameter of the relay device in the foregoing two designs, the core network control plane device selects, from the subscription data of the power consumption parameter of the relay device, a value that satisfies the condition for the configured value of the power consumption parameter of the relay device in the foregoing design, as the configured value of the power consumption parameter of the relay device.

The method can ensure that the requirement of the relay device is satisfied as far as possible, while ensuring that the configured value of the power consumption parameter of the relay device belongs to the subscription data of the power consumption parameter of the relay device.

It should be noted that, in various designs of the following method in which the core network control plane device considers the subscription data of the power consumption parameter of the terminal device and the subscription data of the power consumption parameter of the relay device (for example, a design of determining candidate configured values of the power consumption parameters of the terminal device and/or the relay device), reference also needs to be made to the foregoing descriptions correspondingly, to ensure that the requirements of the relay device and the terminal device are satisfied as far as possible, while ensuring that the configured values (or candidate configured values) of the power consumption parameters of the relay device and the terminal device belong to the subscription data of the power consumption parameters of the relay device and the terminal device.

Optionally, in a second implementation scenario of the foregoing embodiment, step S203 includes at least the following three designs:

In a first possible design of the second implementation scenario, the power consumption parameter includes the PSM activation time, and both a configured value of the PSM activation time of the relay device and a configured value of the PSM activation time of the terminal device are a larger one of an expected value of the PSM activation time of the terminal device and an expected value of the PSM activation time of the relay device.

As can be known based on the description about the first design in the first implementation scenario, in the design, the method can ensure that the relay device does not enter the PSM earlier than the terminal device. Therefore, data transmission efficiency of the terminal device is ensured, while power consumption of the relay device is reduced.

In a second possible design in the second implementation scenario, the power consumption parameter includes the periodic location update timer duration, and both a configured value of the periodic location update timer duration of the relay device and a configured value of the periodic location update timer duration of the terminal device are a smaller one of an expected value of the periodic location update timer duration of the terminal device and an expected value of the periodic location update timer duration of the relay device.

As can be known based on the description about the second design in the second implementation scenario, the design can ensure that the relay device and the terminal device enter the active state simultaneously after both the relay device and the terminal device enter the idle state. This ensures that the relay device does not affect data transmission of the terminal device, and further ensures data transmission efficiency of the terminal device.

In a third possible design in the second implementation scenario, the power consumption parameter includes the eDRX cycle duration, and both a configured value of eDRX cycle duration of the relay device and a configured value of eDRX cycle duration of the terminal device are a smaller one of an expected value of the eDRX cycle duration of the terminal device and an expected value of the eDRX cycle duration of the relay device.

In the communications field, a device using the eDRX technology continuously transmits data based on an eDRX cycle, and can transmit data in a specific time period of each eDRX cycle, but cannot transmit data in another specific time period.

For example, in a scenario in which a terminal device transmits data through a relay device, to ensure data transmission efficiency of the terminal device, duration of an eDRX cycle of the relay device needs to be the same as duration of an eDRX cycle of the terminal device. Likewise, in a scenario in which the terminal device transmits data through the relay device in this embodiment, to ensure data transmission efficiency of the terminal device, duration of an eDRX cycle of the relay device needs to be the same as duration of an eDRX cycle of the terminal device.

For example, in a scenario in which N terminal devices transmit data through the relay device, where N is greater than 1, the core network control plane device may first determine the configured value of the eDRX cycle duration of the relay device and a configured value of eDRX cycle duration of a first one of the N terminal devices, and then determine that a configured value of eDRX cycle duration of another one of the N terminal devices is equal to the configured value of the eDRX cycle duration of the first device. Alternatively, the core network control plane device first directly determines a smallest value, and then determines that both the expected value of the eDRX cycle duration of the relay device and an expected value of eDRX cycle duration of each of the N terminal devices are the smallest value.

Because the eDRX cycle duration is related to a latency in receiving downlink data by the terminal device (or the relay device), if longer eDRX cycle duration is set, sleep time of the terminal device is longer, and the terminal device (or the relay device) can receive downlink data only after the sleep ends. Consequently, the latency in receiving downlink data by the terminal device (or the relay device) is also higher. Therefore, in this embodiment of this application, to ensure that the eDRX cycle duration can satisfy requirements on latencies in receiving downlink data by the terminal device and the relay device (or requirements on lowest latencies in receiving downlink data by the terminal device and the relay device), in the design, the core network control plane device determines that the configured value of the eDRX cycle duration of the relay device and the configured value of the eDRX cycle duration of the terminal device are both the smaller one of the expected value of the eDRX cycle duration of the terminal device and the expected value of the eDRX cycle duration of the relay device. Obviously, the design can satisfy the requirements on latencies in receiving downlink data by the terminal device and the relay device, and ensure data transmission efficiency of the terminal device.

Optionally, in a third implementation scenario of the foregoing embodiment, S203 includes:

the core network control plane device determines a candidate configured value of the power consumption parameter of the terminal device based on subscription data of the power consumption parameter of the terminal device and the expected value of the power consumption parameter of the terminal device;

the core network control plane device determines a candidate configured value of the power consumption parameter of the relay device based on subscription data of the power consumption parameter of the relay device and the expected value of the power consumption parameter of the relay device; and the core network control plane device determines the configured value of the power consumption parameter of the relay device and the configured value of the power consumption parameter of the terminal device based on the candidate configured value of the power consumption parameter of the relay device and the candidate configured value of the power consumption parameter of the terminal device.

Because the subscription data of the power consumption parameters of the relay device and the terminal device specifies usable values or ranges of the power consumption parameters that the relay device and the terminal device subscribe to, when the core network control plane device performs S203, the subscription data of the power consumption parameter of the terminal device and the subscription data of the power consumption parameter of the relay device further need to be considered, to further ensure that the determined configured value of the power consumption parameter of the relay device belongs to the subscription data of the power consumption parameter of the relay device, and ensure that the determined configured value of the power consumption parameter of the terminal device belongs to the subscription data of the power consumption parameter of the terminal device.

In a first possible design of the third implementation scenario, the power consumption parameter includes the PSM activation time, and both a configured value of the PSM activation time of the relay device and a configured value of the PSM activation time of the terminal device are a larger one of a candidate configured value of the PSM activation time of the relay device and a candidate configured value of the PSM activation time of the terminal device.

As can be known based on the description about the first design in the third implementation scenario, in the design, the method can ensure that the relay device does not enter the PSM earlier than the terminal device. Therefore, data transmission efficiency of the terminal device is ensured, while power consumption of the relay device is reduced.

In a second possible design in the third implementation scenario, the power consumption parameter includes the periodic location update timer duration, and both a configured value of the periodic location update timer duration of the relay device and a configured value of the periodic location update timer duration of the terminal device are a smaller one of a candidate configured value of the periodic location update timer duration of the relay device and a candidate configured value of the periodic location update timer duration of the terminal device.

As can be known based on the description about the second design in the third implementation scenario, the design can ensure that the relay device and the terminal device enter the active state simultaneously after both the relay device and the terminal device enter the idle state. This ensures that the relay device does not affect data transmission of the terminal device, and further ensures data transmission efficiency of the terminal device.

In a third possible design in the third implementation scenario, the power consumption parameter includes the eDRX cycle duration, and both a configured value of eDRX cycle duration of the relay device and a configured value of the eDRX cycle duration of the terminal device are a smaller one of a candidate configured value of the eDRX cycle duration of the terminal device and a candidate configured value of the eDRX cycle duration of the relay device.

As can be known based on the description about the third design in the third implementation scenario, the design can ensure that requirements on latencies in receiving downlink data by the terminal device and the relay device are satisfied, and ensure data transmission efficiency of the terminal device.

In addition, as can be known from the description about the conventional eDRX technology, when the terminal device and the relay device use the eDRX technology to reduce power consumption, the core network control plane device not only needs to configure the eDRX cycle duration of the terminal device and the eDRX cycle duration of the relay device, but also needs to determine data transmission configurations in eDRX cycles of the terminal device and the relay device, for example, time of allowed uplink data transmission (for example, an activation time period), time of forbidding data transmission (for example, a sleep time period), a data forwarding time period (time of forwarding downlink data of the terminal device by the relay device to the terminal device), and the like. Therefore, data transmission efficiency of the terminal device can be further ensured.

Therefore, optionally, when the power consumption parameter includes the eDRX cycle duration, after the core network control plane device determines the configured value of the eDRX cycle duration of the relay device and the configured value of the eDRX cycle duration of the terminal device that are the same, the method further includes: the core network control plane device determines the data transmission configurations in the eDRX cycles of the terminal device and the relay device. Specifically, the method includes but is not limited to the following two manners.

Manner 1:

The core network control plane device determines an activation time period and a data forwarding time period in the eDRX cycle of the relay device and a sleep time period and a data forwarding time period in the eDRX cycle of the terminal device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device; and the core network control plane device sends the activation time period and the data forwarding time period in the eDRX cycle of the relay device and the sleep time period and the data forwarding time period in the eDRX cycle of the terminal device to the relay device.

In this embodiment of this application, an activation time period in an eDRX cycle of any device is a time period in which the device sends uplink data in the eDRX cycle to the network; a sleep time period in the eDRX cycle of the device is a time period in which the device is not allowed to perform data (uplink data and downlink data) transmission in the eDRX cycle; and a data forwarding time period in the eDRX cycle of the device may be a time period in which the device can perform downlink data transmission with another device having a same data forwarding time period.

In the foregoing manner, the data forwarding time period in the eDRX cycle of the terminal device is the same as the data forwarding time period in the eDRX cycle of the relay device. This can ensure that when the relay device receives downlink data of the terminal device from a network side (a core network user plane device), the downlink data can be forwarded to the terminal device in the data forwarding time period of the relay device.

Figure 3:
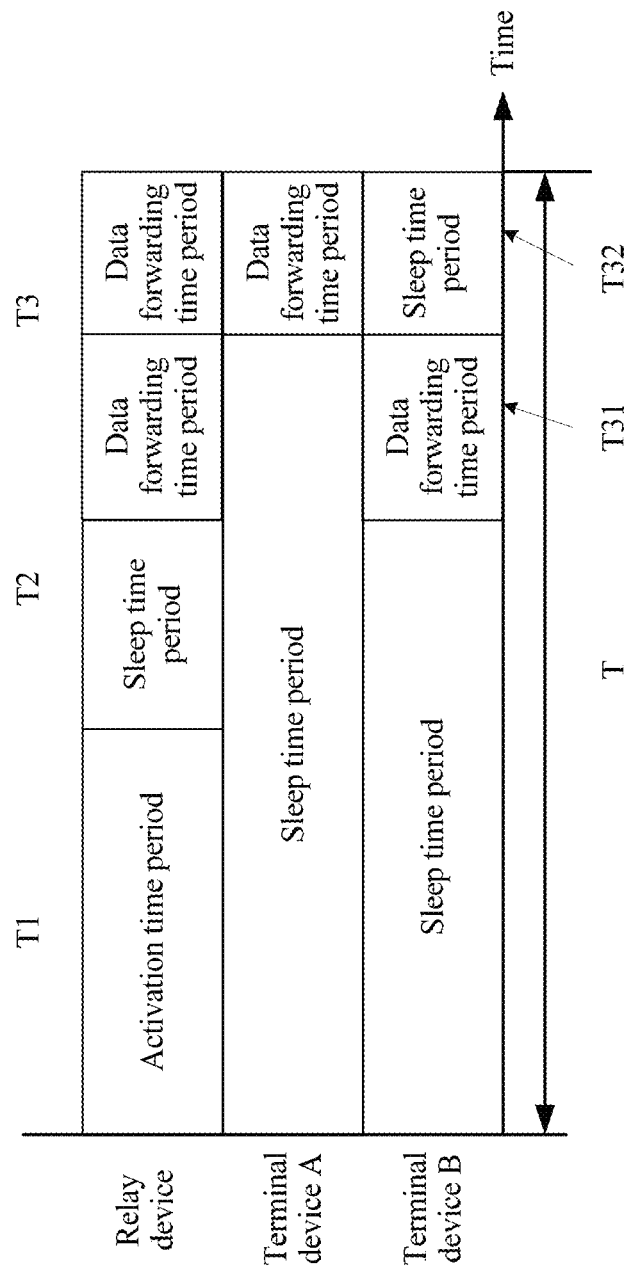
FIG. 3 is a first schematic diagram of data transmission configurations in eDRX cycles of two terminal devices and a relay device according to an embodiment of this application.

In an example, N terminal devices access a RAN by using a relay device. A data forwarding time period in an eDRX cycle of the relay terminal devices may be divided into a plurality of sub time periods. Each sub time period may be the same as data forwarding time periods of some of the N terminal devices. For example, as shown in FIG. 3, data forwarding time T3 of the relay device is divided into two sub time periods T31 and T32. In T31, the relay device may forward downlink data that needs to be sent to a terminal device B to the terminal device B. In T32, the relay device may forward downlink data that needs to be sent to a terminal device A to the terminal device A.

Figure 4:
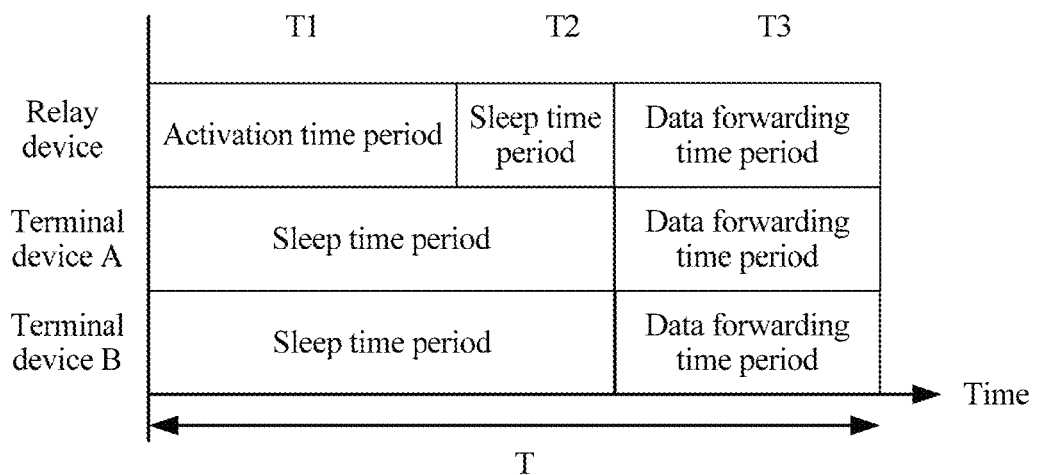
FIG. 4 is a second schematic diagram of data transmission configurations in eDRX cycles of two terminal devices and a relay device according to an embodiment of this application.

The data forwarding time period in the eDRX cycle of the relay device may be the same as a data forwarding time period of each of the N terminal devices, as shown in FIG. 4.

In this embodiment of this application, the eDRX cycle of the relay device includes three time periods: the activation time period, a sleep time period, and the data forwarding time period. Therefore, the core network control plane device may determine only the activation time period and the data forwarding time period in the eDRX cycle of the relay device. Therefore, after the relay device receives the activation time period and the data forwarding time period in the eDRX cycle of the relay device, the relay device may also obtain the sleep time period in the eDRX cycle of the relay device by using the two time periods.

Optionally, in a scenario in which the terminal device does not need to send uplink data to the network side, the eDRX cycle of the terminal device may not include an activation time period. For example, FIG. 3 and FIG. 4 are schematic diagrams of data transmission configurations in eDRX cycles of two terminal devices and a relay device.

Figure 5:
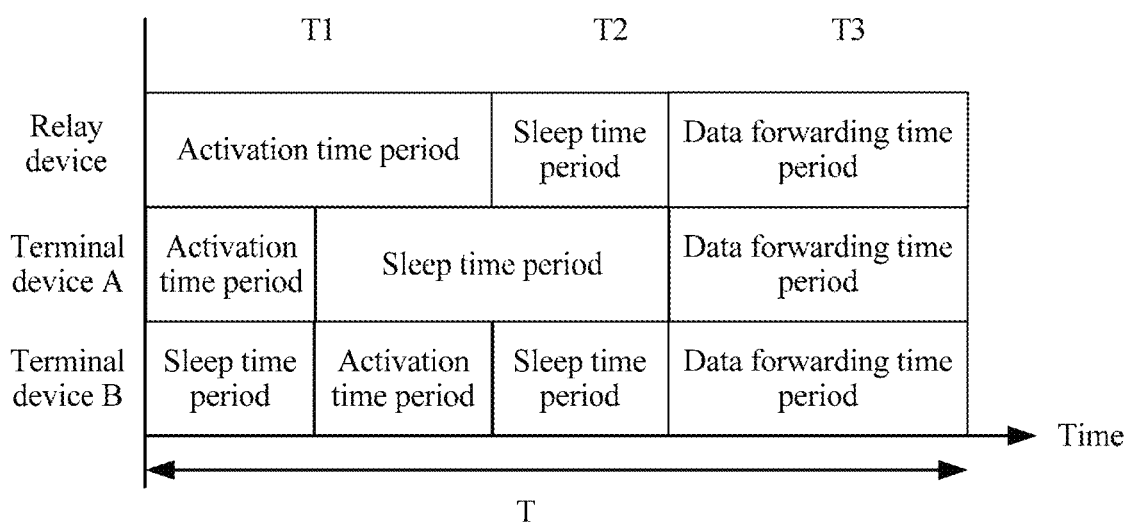
FIG. 5 is a third schematic diagram of data transmission configurations in eDRX cycles of two terminal devices and a relay device according to an embodiment of this application.

Optionally, in a scenario in which the terminal device needs to send uplink data to the network side through the relay device, the core network control plane device further needs to reserve, in the eDRX cycle of the terminal device, the activation time period in the eDRX cycle of the terminal device, and ensure that an intersection set exists between activation time periods in the eDRX cycles of the N terminal devices and the activation time period in the eDRX cycle of the relay device. For example, FIG. 5 is a schematic diagram of data transmission configurations in eDRX cycles of two terminal devices and a relay device. This can ensure that when the terminal device in the activation time period needs to send uplink data to the network side, the relay device is also in the activation time period, and can transmit the uplink data of the terminal device.

Optionally, in a scenario in which the data forwarding time periods in the eDRX cycles of the relay device and the terminal device may also be used to transmit uplink data, the terminal device may send uplink data to the relay device in the data forwarding time period, and the relay device also forwards the uplink data to the network side in the data forwarding time period.

Optionally, the relay device may also receive, in the data forwarding time period in the eDRX cycle, downlink data of the relay device and/or the terminal device that is sent by the network side, to reduce a latency in transmitting downlink data, and improve efficiency of forwarding the downlink data.

Manner 2:

The core network control plane device determines a sleep time period and a data forwarding time period in the eDRX cycle of the relay device and a sleep time period and a data forwarding time period in the eDRX cycle of the terminal device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device; and the core network control plane device sends the sleep time period and the data forwarding time period in the eDRX cycle of the relay device and the sleep time period and the data forwarding time period in the eDRX cycle of the terminal device to the relay device.

Optionally, when performing S204, the core network control plane device may send content determined in the manner 1 or the manner 2 to the relay device. After receiving the sleep time period and the data forwarding time period in the eDRX cycle of the terminal device, the relay device sends the sleep time period and the data forwarding time period in the eDRX cycle of the terminal device to the terminal device.

In the manner 2, the core network control plane device determines the sleep time period and the data forwarding time period in the eDRX cycle of the relay device, but in the manner 1, the core network control plane device determines the activation time period and the data forwarding time period in the eDRX cycle of the relay device. Therefore, mutual reference may be made for the two manners. Details are not described again herein.

As can be known from the description about the manner 1, in this embodiment of this application, the eDRX cycle of the relay device includes three time periods: an activation time period, the sleep time period, and the data forwarding time period. Therefore, the core network control plane device may also determine the sleep time period and the data forwarding time period in the eDRX cycle of the relay device. Therefore, after the relay device receives the sleep time period and the data forwarding time period in the eDRX cycle of the relay device, the relay device may also obtain the activation time period in the eDRX cycle of the relay device by using the two time periods.

In the foregoing two manners, the core network control plane device may determine the data transmission configurations in the eDRX cycles of the terminal device and the relay device, to further ensure data transmission efficiency of the terminal device.

Optionally, in the foregoing two manners, the core network control plane device may determine the sleep time period in the eDRX cycle of the terminal device and the activation time period (or the sleep time period) in the eDRX cycle of the relay device by using the following method:

The core network control plane device determines the sleep time period in the eDRX cycle of the terminal device and the activation time period (or the sleep time period) in the eDRX cycle of the relay device based on power consumption status information of the terminal device and the relay device, where the power consumption status information includes at least one of the following: information about remaining power of a battery, a battery type, and a device type.

The information about the remaining power of the battery may be a percentage of the remaining power of the battery, a status of the remaining power of the battery, a value of the remaining power of the battery, or the like. The battery type may be whether the battery is chargeable, whether the battery can be used repeatedly, or the like. A type of the terminal device includes a mobile phone, a wearable device, or the like.

For example, when the terminal device A is a wearable device, and the terminal device B is a mobile phone, the core network may set a sleep time period of the terminal device A to be longer than a sleep time period of the terminal device B. For another example, when the terminal device A is in a high power state, and the terminal device B is in a low power state, the core network may set a sleep time period of the terminal device A to be shorter than a sleep time period of the terminal device B.

In the foregoing method, the core network control plane device may determine the sleep time period in the eDRX cycle of the terminal device and the activation time period (or the sleep time period) in the eDRX cycle of the relay device based on the power consumption status information of the terminal device and the relay device. Therefore, power of the battery of the terminal device can be utilized properly, and utilization of the battery is improved.

Optionally, the core network control plane device may determine the data forwarding time periods in the eDRX cycles of the terminal device and the relay device by using the following method:

The core network control plane device determines the data forwarding time period in the eDRX cycle of the terminal device based on service feature parameters of the terminal device and the relay device, where the service feature parameters include at least one of the following: communication duration and communication data amount information (for example, information such as a size of a communication data packet and a quantity of data packets).

In the foregoing method, the core network control plane device may determine the data forwarding time periods in the eDRX cycles of the terminal device and the relay device based on the service feature parameters of the terminal device and the relay device. Therefore, the data forwarding time periods can be utilized properly, and resource utilization is improved.

In a plurality of scenarios, a plurality of terminal devices using the eDRX technology exist in a relatively small space range. Any one of the terminal devices may serve as a relay device for transmitting data of another terminal device. To be specific, in the scenarios, each terminal device may access the network in the foregoing two manners. How to configure eDRX cycles of the plurality of terminal devices to optimize power consumption of the plurality of terminal devices and ensure data transmission efficiency of the plurality of terminal devices in the scenarios is also a problem urgently to be resolved in this field.

Figure 6:
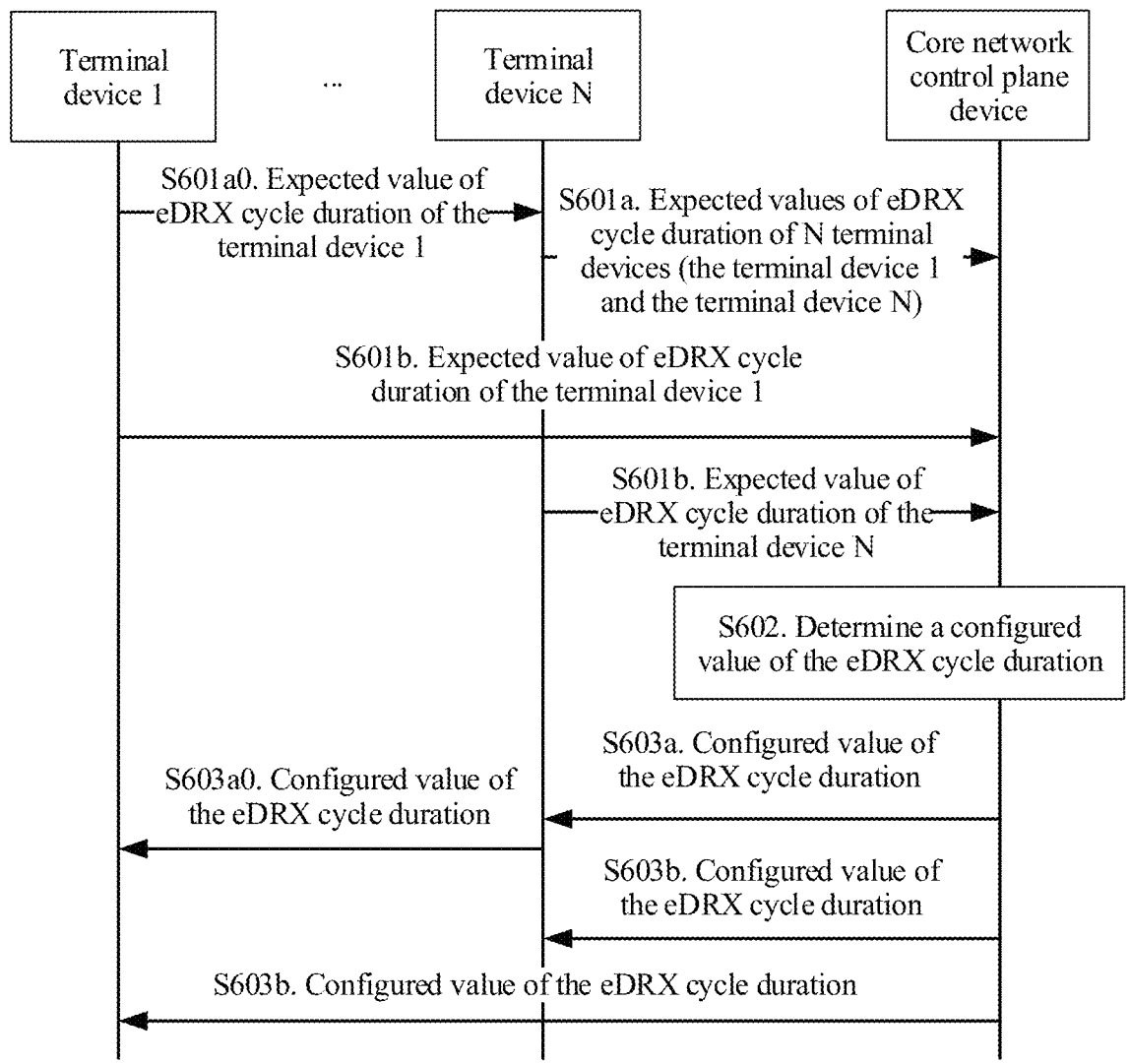
FIG. 6 is a flowchart of another method for configuring a power consumption parameter according to an embodiment of this application.

To optimize power consumption of the plurality of terminal devices while ensuring data transmission efficiency of the plurality of terminal devices in the foregoing scenario, this application further provides another method for configuring a power consumption parameter, as shown in FIG. 6.

S601. A core network control plane device receives expected values of eDRX cycle duration of N terminal devices, where N is an integer greater than or equal to 2.

Optionally, as shown in the figure, the core network control plane device may receive the expected values of the eDRX cycle duration of the N terminal devices in the following two manners.

Manner a: The core network control plane device receives the expected values of the eDRX cycle duration of the N terminal devices that are sent by one of the N terminal devices.

For example, as shown in the figure, in S601*a*0, after being connected to a terminal device N, each of other terminal devices than the terminal device N of the N terminal devices sends its expected value of eDRX cycle duration to the terminal device N; and in S601*a*, the terminal device N sends the expected values of the eDRX cycle duration of the N terminal devices (including the terminal device N and other terminal devices connected to the terminal device N) to the core network control plane device.

Manner b: The core network control plane device separately receives an expected value of eDRX cycle duration that is sent by each of the N terminal devices, where the eDRX cycle duration is eDRX cycle duration of the corresponding terminal device. As shown in the figure, in S601*b*, the core network control plane device separately receives an expected value of eDRX cycle duration of a terminal device 1 that is sent by the terminal device 1, and an expected value of eDRX cycle duration of a terminal device N that is sent by the terminal device N.

S602. The core network control plane device determines a configured value of the eDRX cycle duration based on the expected values of the eDRX cycle duration of the N terminal devices.

Each of the N terminal devices may serve as a relay device for transmitting data of another terminal device. Therefore, as can be known from a principle for configuring the eDRX cycle duration of the N terminal devices and the relay device in the embodiment shown in FIG. 2, to ensure data transmission efficiency of the N terminal devices, the eDRX cycle duration of the relay device needs to be the same as the eDRX cycle duration of all the N terminal devices. Therefore, in this embodiment of this application, to ensure data transmission efficiency of the N terminal devices, the configured value of the eDRX cycle duration determined by the core network control plane device is applicable to the N terminal devices. To be specific, configured values of the eDRX cycle duration of the N terminal devices are the same.

Optionally, the configured value of the eDRX cycle duration determined by the core network control plane device is a smallest one of the expected values of the eDRX cycle duration of the N terminal devices.

By performing the foregoing step, the core network control plane device determines that the configured value of the eDRX cycle duration is the smallest one of the expected values of the eDRX cycle duration of the N terminal devices. Obviously, the method can satisfy requirements on latencies in receiving downlink data by the N terminal devices, and ensure data transmission efficiency of the N terminal devices.

Optionally, when the core network control plane device determines the eDRX cycle duration, subscription data of the eDRX cycle duration of the N terminal devices further needs to be considered, to ensure that the determined configured value of the eDRX cycle duration satisfies a requirement of the subscription data of the eDRX cycle duration of the N terminal devices.

In an example, that the core network control plane device determines a configured value of the eDRX cycle duration based on the expected values of the eDRX cycle duration of the N terminal devices includes the following steps:

The core network control plane device determines candidate configured values of the eDRX cycle duration of the N terminal devices based on the subscription data of the eDRX cycle duration of the N terminal devices and the expected values of the eDRX cycle duration of the N terminal devices; and the core network control plane device determines the configured value of the eDRX cycle duration based on the candidate configured values of the eDRX cycle duration of the N terminal devices.

The foregoing steps can ensure that the configured value of the eDRX cycle duration belongs to the subscription data of the eDRX cycle duration of the N devices.

Optionally, the configured value of the eDRX cycle duration is a smallest one of the candidate configured values of the eDRX cycle duration of the N terminal devices. Therefore, the configured value of the eDRX cycle duration can satisfy requirements on latencies in receiving downlink data by the N terminal devices, and ensure data transmission efficiency of the N terminal devices.

S603. The core network control plane device sends the configured value of the eDRX cycle duration to the N terminal devices.

Optionally, as shown in the figure, the core network control plane device may perform S603 in the following two manners.

Manner a: The core network control plane device sends the configured value of the eDRX cycle duration to one of the N terminal devices, and then the terminal device sends the configured value of the eDRX cycle duration to another terminal device of the N terminal devices.

For example, as shown in the figure, in S603a, the core network control plane device sends the configured value of the eDRX cycle duration to the terminal device N of the N terminal devices; and then in S603a0, the terminal device N sends the configured value of the eDRX cycle duration to another terminal device (including the terminal device 1).

Manner b: The core network control plane device sends the configured value of the eDRX cycle duration to each of the N terminal devices separately. As shown in the figure, in S603b, the core network control plane device sends the configured value of the eDRX cycle duration to the terminal device 1 and sends the configured value of the eDRX cycle duration to the terminal device N separately.

The N terminal devices set the eDRX cycle duration based on the configured value of the eDRX cycle duration.

Optionally, after the core network control plane device determines the configured value of the eDRX cycle duration, the method further includes:

the core network control plane device determines activation time periods, sleep time periods, and data forwarding time periods in eDRX cycles of the N terminal devices, where a data forwarding time period in an eDRX cycle of each of the N terminal devices is the same as a data forwarding time period in an eDRX cycle of at least one other terminal device of the N terminal devices, and duration of the eDRX cycles of the N terminal devices is the configured value of the eDRX cycle duration; and the core network control plane device sends the activation time periods, the sleep time periods, and the data forwarding time periods in the eDRX cycles of the N terminal devices to the N terminal devices.

In the foregoing method, the data forwarding time period in the eDRX cycle of each of the N terminal devices is the same as the data forwarding time period in the eDRX cycle of at least one other terminal device of the N terminal devices. This can ensure that a plurality of terminal devices having a same data forwarding time period in eDRX cycles may perform downlink data forwarding. To be specific, data received by a terminal device in an activation time period in the plurality of terminal devices may be forwarded to another terminal device in the data forwarding time period.

Optionally, no intersection set exists between activation time periods in eDRX cycles of any two of the N terminal devices. Therefore, when a terminal device in an eDRX cycle is in an activation time period, all other terminal devices are in sleep time periods. This ensures that when a core network user plane network element needs to send downlink data to the N terminal devices, the downlink data may be sent to the terminal device in the activation time period in the N terminal devices. This can ensure that downlink data in a core network user plane device can be delivered to a terminal device in time, prevent the core network user plane device from buffering excessive downlink data, and further maximally reduce power consumption of the N terminal devices.

Optionally, each of the N terminal devices may send uplink data to the core network user plane device in the activation time period in the eDRX cycle; or each terminal device sends uplink data to the core network user plane device in the data forwarding time period in the eDRX cycle. This is not limited in this application.

Figure 7:
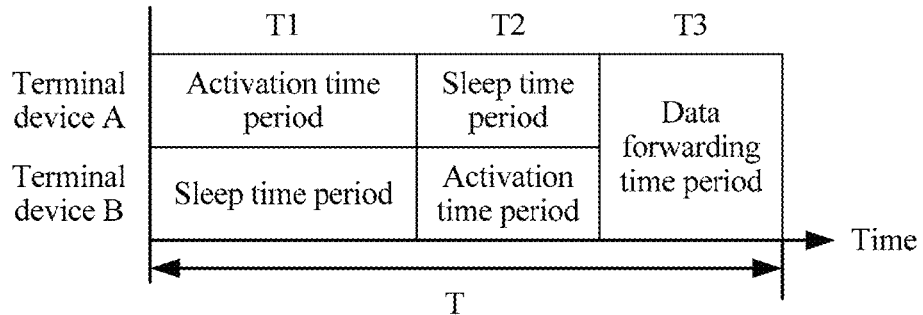
FIG. 7 is a first schematic diagram of data transmission configurations in eDRX cycles of terminal devices according to an embodiment of this application.

Example 1: A mobile communications system includes two terminal devices: a terminal device A and a terminal device B; in this case, after the core network control plane device determines a configured value T of eDRX cycle duration of the two terminal devices, the core network control plane device determines that an activation time period, a sleep time period, and a data forwarding time period of each terminal device in T satisfy the foregoing two conditions, as shown in FIG. 7.

In a time period T1 in an eDRX cycle T, the terminal device A is in the activation time period and may receive first data sent by the core network user plane device in the mobile communications system, and the terminal device B is in the sleep time period; in a time period T2, the terminal device B is in the activation time period and may receive second data sent by the core network user plane device, and the terminal device A is in the sleep time period; and in a time period T3, the terminal device A and the terminal device B are both in the data forwarding time period, the terminal device A may send the received first data to the terminal device B, and the terminal device B may also send the received second data to the terminal device A.

Optionally, in the eDRX cycle, one data forwarding time period may exist. To be specific, data forwarding time periods of the N terminal device overlap each other. As shown in the foregoing example 1, a plurality of data forwarding time periods may also exist. This is not limited.

Optionally, in the eDRX cycle, a plurality of data forwarding time periods may also exist. Each data forwarding time period specifies a data forwarding direction. For example, the terminal device A can send data to the terminal device B in one direction only, as shown in the following example 2. Alternatively, each data forwarding time period specifies some terminal devices that perform data forwarding. For example, in a data forwarding time period, three of five terminal devices can forward data to each other, and in another data forwarding time period, the other two terminal devices forward data to each other.

Figure 8:
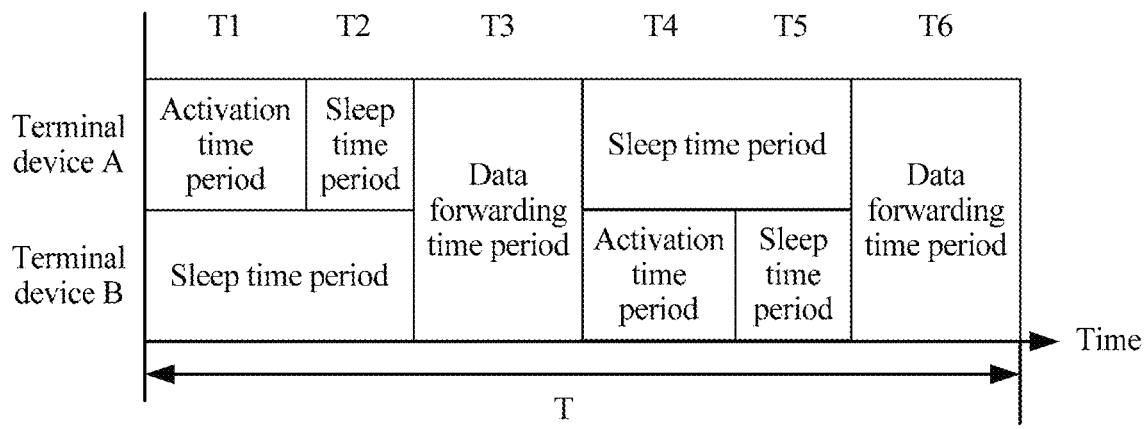
FIG. 8 is a second schematic diagram of data transmission configurations in eDRX cycles of terminal devices according to an embodiment of this application.

Example 2: Still using a scenario of the example 1 as an example, the core network control plane device determines that an activation time period, a sleep time period, and a data forwarding time period of each terminal device in T satisfy the foregoing two conditions, as shown in FIG. 8.

In a time period T1 in an eDRX cycle T, the terminal device A is in the activation time period and may receive first data sent by the core network user plane device in the mobile communications system, and the terminal device B is in the sleep time period; in a time period T2, the terminal device A and the terminal device B are both in the sleep time period; in a time period T3, the terminal device A and the terminal device B are both in the data forwarding time period, and the terminal device A may send the received first data to the terminal device B; in a time period T4, the terminal device B is in the activation time period and may receive second data sent by the core network user plane device in the mobile communications system, and the terminal device A is in the sleep time period; in a time period T5, the terminal device A and the terminal device B are both in the sleep time period;

and in a time period T6, the terminal device A and the terminal device B are both in the data forwarding time period, and the terminal device B may send the received second data to the terminal device A.

Example 3: A mobile communications system includes three terminal devices: a terminal device A, a terminal device B, and a terminal device C; in this case, after the core network control plane device determines a configured value T of eDRX cycle duration of the three terminal devices, the core network control plane device determines that an activation time period, a sleep time period, and a data forwarding time period of each terminal device in an eDRX cycle T satisfy the foregoing two conditions, as shown in FIG. 9.

In a time period T1 in the eDRX cycle T, the terminal device A is in the activation time period and may receive first data sent by the core network user plane device in the mobile communications system, and the terminal device B and the terminal device C are in the sleep time period; in a time period T2, the terminal device B is in the activation time period and may receive second data send by the core network user plane device, and the terminal device A and the terminal device C are in the sleep time period; in a time period T3, the terminal device C is in the activation time period and may receive third data sent by the core network user plane device, and the terminal device A and the terminal device B are in the sleep time period; in a time period T4, the terminal device A, the terminal device B, and the terminal device C are all in the data forwarding time period, the terminal device A may send the received first data to the terminal device B or the terminal device C, the terminal device B may also send the received second data to the terminal device A or the terminal device C, and the terminal device C may also send the received third data to the terminal device A or the terminal device B.

Figure 9:
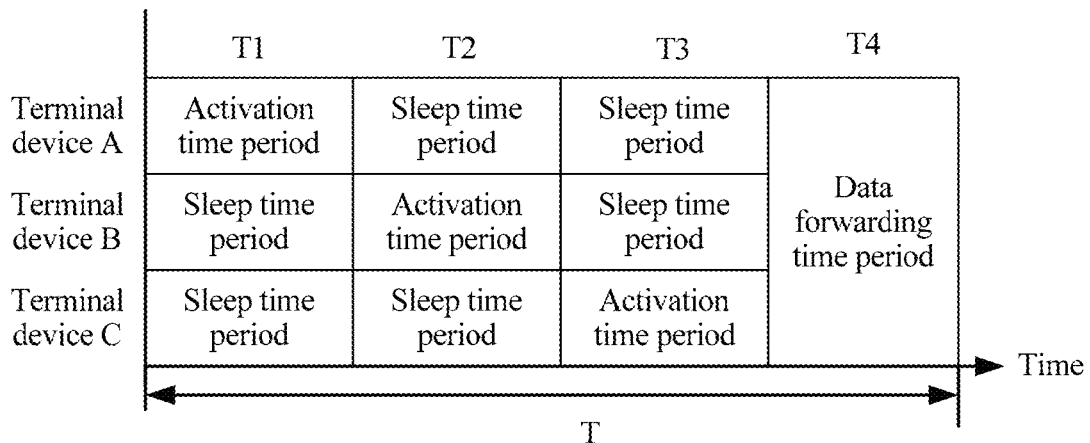
FIG. 9 is a third schematic diagram of data transmission configurations in eDRX cycles of terminal devices according to an embodiment of this application.

It should be noted that, manners of configuring the activation time periods, the sleep time periods, and the data forwarding time periods in the eDRX cycles of the plurality of terminal devices shown in FIG. 7 to FIG. 9 are only several examples of this embodiment of this application, and the method for configuring the activation time periods, the sleep time periods, and the data forwarding time periods in the eDRX cycles of the plurality of terminal devices is not limited. Many other configuration manners satisfying the foregoing two conditions are also available, and are not illustrated in this embodiment of this application.

Optionally, in a process in which the core network control plane device determines the activation time periods, the sleep time periods, and the data forwarding time periods in the eDRX cycles of the N terminal devices, the core network control plane device may determine the activation time periods in the eDRX cycles of the N terminal devices by using the following method:

The core network control plane device determines the activation time periods in the eDRX cycles of the N terminal devices based on power consumption status information of the N terminal devices, where the power consumption status information includes at least one of the following: information about remaining power of a battery, a battery type, and a device type.

The information about the remaining power of the battery may be a percentage of the remaining power of the battery, a status of the remaining power of the battery, a value of the remaining power of the battery, or the like. The battery type may be whether the battery is chargeable, whether the battery can be used repeatedly, or the like. A type of the terminal device includes a mobile phone, a wearable device, or the like.

For example, when the terminal device A is a wearable device, and the terminal device B is a mobile phone, the core network may set an activation time period of the terminal device A to be shorter than an activation time period of the terminal device B. For another example, when the terminal device A is in a high power state, and the terminal device B is in a low power state, the core network may set an activation time period of the terminal device A to be longer than an activation time period of the terminal device B.

In the foregoing method, the core network control plane device may determine an activation time period in the eDRX cycle of each terminal device based on power consumption status information of each terminal device. Therefore, power of a battery of each terminal device can be utilized properly, and utilization of the battery is improved.

Optionally, in a process in which the core network control plane device determines the activation time periods, the sleep time periods, and the data forwarding time periods in the eDRX cycles of the N terminal devices, the core network control plane device may determine the data forwarding time periods in the eDRX cycles of the N terminal devices by using the following method:

The core network control plane device determines the data forwarding time periods in the eDRX cycles of the N terminal devices based on service feature parameters of the N terminal devices, where the service feature parameters include at least one of the following: communication duration and communication data amount information (for example, information such as a size of a communication data packet and a quantity of data packets).

In the foregoing method, the core network control plane device may determine a data forwarding time period in an eDRX cycle of each terminal device based on a service feature parameter of each terminal device. Therefore, data forwarding time can be utilized properly, and resource utilization is improved.

Optionally, after the core network control plane device sends the activation time periods, the sleep time periods, and the data forwarding time periods of the N terminal devices to the N terminal devices, the method further includes:

the core network control plane device receives a downlink data notification message sent by the core network user plane device, where the downlink data notification message is used to notify the core network control plane device that the core network user plane device has received downlink data of a target terminal device, and the target terminal device is one of the N terminal devices;

when the target terminal device is in a sleep time period, the core network control plane device determines a forwarding terminal device from the N terminal devices based on the activation time periods, the sleep time periods, and the data forwarding time periods of the N terminal devices, where the forwarding terminal device is in an activation time period, and a data forwarding time period of the forwarding terminal device is the same as a data forwarding time period of the target terminal device;

the core network control plane device sends a paging message to the forwarding terminal device; and the core network control plane device receives a paging response from the forwarding terminal device, and instructs the core network user plane device to send the downlink data of the target terminal device to the forwarding terminal device.

In the foregoing method, when the core network user plane device has downlink data to be sent to the target terminal device, the core network control plane device may determine, based on an overlapping relationship between the data forwarding time periods in the eDRX cycles of the N terminal devices, the forwarding terminal device that is in the activation time period and can be paged, so that the core network user plane device can first send the downlink data to the forwarding terminal device. Therefore, in data forwarding time periods in eDRX cycles of the forwarding terminal device and the target terminal device, the forwarding terminal device sends the downlink data to the target terminal device. This can ensure that the downlink data in the core network user plane device can be delivered to the terminal device in time, and prevent the core network user plane device from buffering excessive downlink data.

Figure 10:
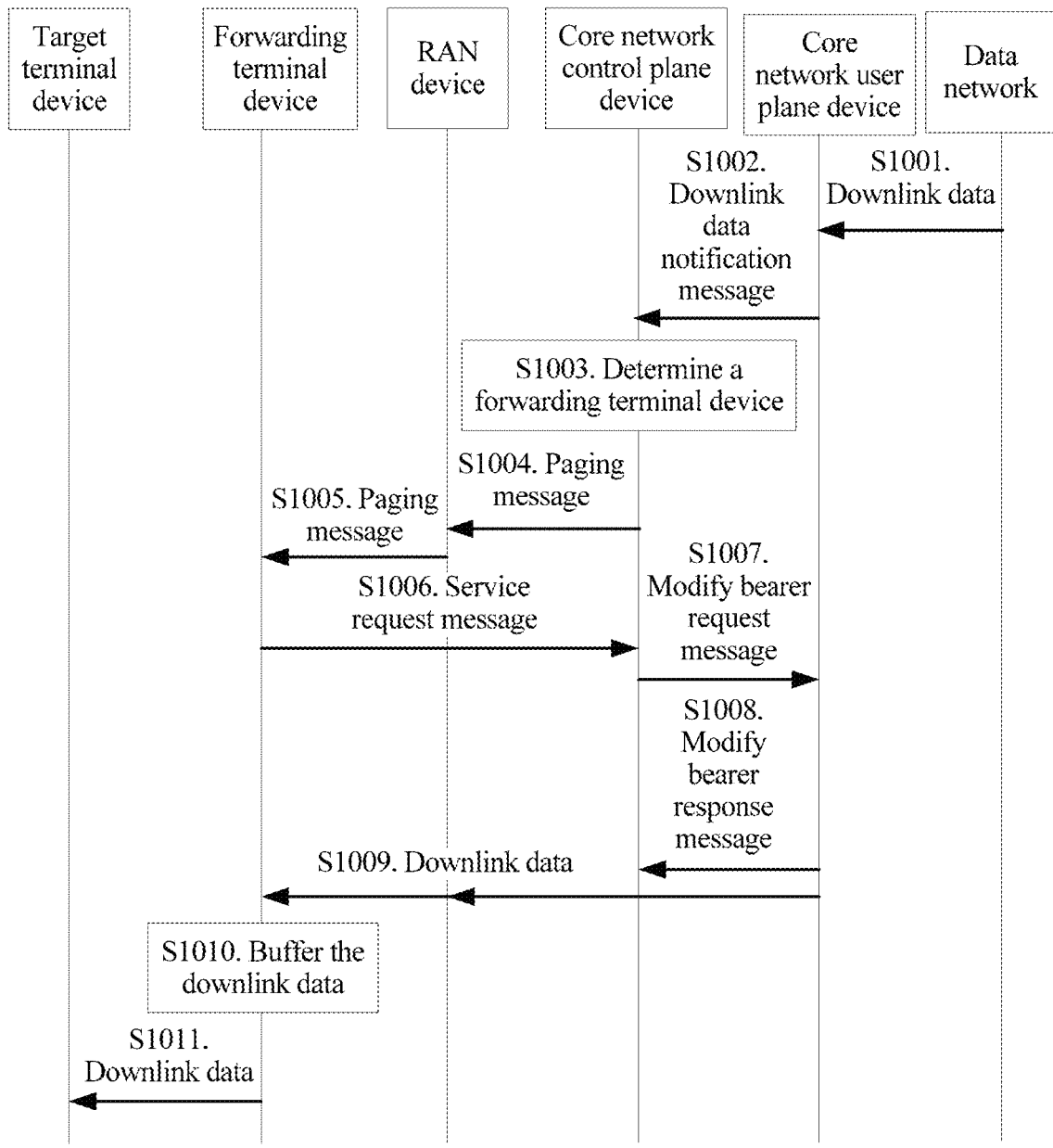
FIG. 10 is a flowchart for sending downlink data according to an embodiment of this application.

Based on the foregoing method, optionally, after the core network control plane device sends the activation time periods, the sleep time periods, and the data forwarding time periods of the N terminal devices to the N terminal devices, a procedure for sending downlink data for a target terminal device includes the following steps, as shown in FIG. 10.

S1001. The core network user plane device receives downlink data of a target terminal device, where the target terminal device is one of the N terminal devices.

S1002. The core network user plane device sends a downlink data notification message to the core network control plane device, to notify the core network control plane device that the core network user plane device has received the downlink data of the target terminal device.

S1003. The core network control plane device determines a forwarding terminal device from the N terminal devices based on an activation time period, a sleep time period, and a data forwarding time period in an eDRX cycle of each of the N terminal devices.

At current time, the forwarding terminal device is in an activation time period, and a data forwarding time period of the forwarding terminal device is the same as a data forwarding time period of the target terminal device.

S1004. The core network control plane device sends a paging message to a RAN device accessed by the forwarding terminal device, where the paging message includes an identifier of the forwarding terminal device.

S1005. The RAN device sends the paging message to the forwarding terminal device.

S1006. The forwarding terminal device sends a service request message to the core network control plane device.

S1007. The core network control plane device sends a modify bearer request message to the core network user plane device to notify an address of the RAN device, to implement forwarding of the downlink data.

S1008. The core network user plane device feeds back a modify bearer response message.

S1009. The core network user plane device may send the downlink data to the RAN device based on the address of the RAN device, and the RAN device forwards the downlink data to the forwarding terminal device.

S1010. The forwarding terminal device buffers the downlink data.

S1011. The forwarding terminal device sends the downlink data to the target terminal device when the forwarding terminal device is in the data forwarding time period.

In the foregoing method, when the core network user plane device has downlink data to be sent to the target terminal device, the core network control plane device may determine, based on an overlapping relationship between the data forwarding time periods in the eDRX cycles of the N terminal devices, the forwarding terminal device that is in the activation time period and can be paged, so that the core network user plane device can first send the downlink data to the forwarding terminal device. Therefore, in data forwarding time periods in eDRX cycles of the forwarding terminal device and the target terminal device, the forwarding terminal device sends the downlink data to the target terminal device. This can ensure that the downlink data in the core network user plane device can be delivered to the terminal device in time, and prevent the core network user plane device from buffering excessive downlink data.

In the communications field, after a terminal device in a mobile communications system enables an eDRX function, a subsequent paging procedure for the terminal device uses paging based on a temporary mobile subscriber identity (S-TMSI). To be specific, a paging message sent by a core network control plane device in the mobile communications system carries an S-TMSI of the terminal device. Obviously, the core network control plane device stores the S-TMSI of the terminal device. However, in some specific scenarios, for example, the core network control plane device is faulty or is powered off, and then is restarted for network recovery, the S-TMSI of the terminal device that is previously stored by the core network control plane device also disappears. Consequently, the core network control plane device cannot continue to use paging based on the S-TMSI, and the eDRX function and service processing of the terminal device are further affected.

In a scenario in which the terminal device in the mobile communications system enables the eDRX function, to avoid the case in which after the core network control plane device is faulty or powered off, the core network control plane device cannot continue to use paging based on the S-TMSI, and the eDRX function and service processing of the terminal device are affected, an embodiment of this application further provides two methods for configuring a power consumption parameter.

The first method includes:

after fault recovery, a core network control plane device in a mobile communications system sends eDRX deactivation information to a RAN device in the mobile communications system;

the RAN device receives the eDRX deactivation information sent by the core network control plane device; and the RAN device broadcasts a system broadcast message based on the eDRX deactivation information, where the system broadcast message indicates that an eDRX function of the RAN device is not enabled.

The second method includes:

after fault recovery, a core network control plane device sends a paging message to a RAN device in a mobile communications system, where the paging message carries an international mobile subscriber identity (IMSI); and if an eDRX function of the RAN device is enabled, the RAN device broadcasts a system broadcast message, where the system broadcast message indicates that the eDRX function of the RAN device is not enabled.

In the foregoing method, the system broadcast message indicates that the eDRX function of the RAN device is not enabled, so that a terminal device and a relay device accessing the RAN device do not enable or stop the eDRX function either.

Optionally, after receiving the system broadcast message of the RAN device, the relay device that accesses the RAN device does not enable the eDRX function based on the system broadcast message. In addition, optionally, the relay device may send an eDRX deactivation indication to a connected terminal device, so that the terminal device does not enable the eDRX function.

In the foregoing method, after fault recovery of the core network control plane device in the mobile communications system, the RAN device sends the system broadcast message to instruct the relay device and the terminal device accessing the RAN device not to enable the eDRX function. This prevents the relay device and the terminal device in the mobile communications system from continuing to enable the eDRX function, and avoids impact on service processing of the terminal device.

Figure 11:
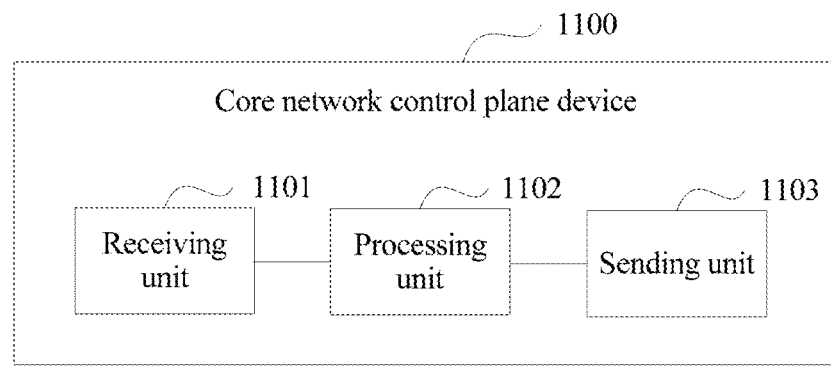
FIG. 11 is a first structural diagram of a core network control plane device according to an embodiment of this application.

Based on the foregoing embodiment, an embodiment of this application further provides a core network control plane device. The core network control plane device is configured to implement the method for configuring a power consumption parameter as shown in FIG. 2. Referring to FIG. 11, the core network control plane device 1100 includes a receiving unit 1101, a processing unit 1102, and a sending unit 1103.

The receiving unit 1101 is configured to receive an expected value of a power consumption parameter of a relay device and an expected value of a power consumption parameter of a terminal device.

The processing unit 1102 is configured to determine a configured value of the power consumption parameter of the relay device and a configured value of the power consumption parameter of the terminal device based on the expected value of the power consumption parameter of the relay device and the expected value of the power consumption parameter of the terminal device.

The sending unit 1103 is configured to send the configured value of the power consumption parameter of the relay device and the configured value of the power consumption parameter of the terminal device to the relay device.

Optionally, the power consumption parameter includes at least one of power saving mode PSM activation time, periodic location update timer duration, and extended discontinuous reception eDRX cycle duration.

Optionally, the processing unit 1102 is specifically configured to:

determine the configured value of the power consumption parameter of the terminal device based on the expected value of the power consumption parameter of the terminal device; and determine the configured value of the power consumption parameter of the relay device based on the expected value of the power consumption parameter of the relay device and the configured value of the power consumption parameter of the terminal device.

Optionally, when a quantity of such terminal devices is greater than 1, the power consumption parameter includes the PSM activation time, a configured value of PSM activation time of the relay device is greater than or equal to a largest one of configured values of PSM activation time of the terminal devices, and the configured value of the PSM activation time of the relay device is greater than or equal to an expected value of the PSM activation time of the relay device; and/or the power consumption parameter includes the periodic location update timer duration, a configured value of periodic location update timer duration of the relay device is less than or equal to a smallest one of configured values of periodic location update timer duration of the terminal devices, and the configured value of the periodic location update timer duration of the relay device is less than or equal to an expected value of the periodic location update timer duration of the relay device.

Optionally, the determining the configured value of the power consumption parameter of the terminal device based on the expected value of the power consumption parameter of the terminal device includes:

determining the configured value of the power consumption parameter of the terminal device based on subscription data of the power consumption parameter of the terminal device and the expected value of the power consumption parameter of the terminal device; and the determining the configured value of the power consumption parameter of the relay device based on the expected value of the power consumption parameter of the relay device and the configured value of the power consumption parameter of the terminal device includes:

determining the configured value of the power consumption parameter of the relay device based on subscription data of the power consumption parameter of the relay device, the expected value of the power consumption parameter of the relay device, and the configured value of the power consumption parameter of the terminal device, where the configured value of the power consumption parameter of the relay device belongs to the subscription data of the power consumption parameter of the relay device.

Optionally, the power consumption parameter includes the PSM activation time, and both a configured value of PSM activation time of the relay device and a configured value of PSM activation time of the terminal device are a larger one of an expected value of the PSM activation time of the terminal device and an expected value of the PSM activation time of the relay device; or the power consumption parameter includes the periodic location update timer duration, and both a configured value of periodic location update timer duration of the relay device and a configured value of periodic location update timer duration of the terminal device are a smaller one of an expected value of the periodic location update timer duration of the terminal device and an expected value of the periodic location update timer duration of the relay device; or the power consumption parameter includes the eDRX cycle duration, and both a configured value of eDRX cycle duration of the relay device and a configured value of eDRX cycle duration of the terminal device are a smaller one of an expected value of the eDRX cycle duration of the terminal device and an expected value of the eDRX cycle duration of the relay device.

Optionally, the processing unit 1102 is specifically configured to:

determine a candidate configured value of the power consumption parameter of the terminal device based on subscription data of the power consumption parameter of the terminal device and the expected value of the power consumption parameter of the terminal device;

determine a candidate configured value of the power consumption parameter of the relay device based on subscription data of the power consumption parameter of the relay device and the expected value of the power consumption parameter of the relay device; and determine the configured value of the power consumption parameter of the relay device and the configured value of the power consumption parameter of the terminal device based on the candidate configured value of the power consumption parameter of the relay device and the candidate configured value of the power consumption parameter of the terminal device.

Optionally, the power consumption parameter includes the PSM activation time, and both a configured value of PSM activation time of the relay device and a configured value of PSM activation time of the terminal device are a larger one of a candidate configured value of the PSM activation time of the relay device and a candidate configured value of the PSM activation time of the terminal device; or the power consumption parameter includes the periodic location update timer duration, and both a configured value of periodic location update timer duration of the relay device and a configured value of periodic location update timer duration of the terminal device are a smaller one of a candidate configured value of the periodic location update timer duration of the relay device and a candidate configured value of the periodic location update timer duration of the terminal device; or the power consumption parameter includes the eDRX cycle duration, and both a configured value of eDRX cycle duration of the relay device and a configured value of eDRX cycle duration of the terminal device are a smaller one of a candidate configured value of the eDRX cycle duration of the terminal device and a candidate configured value of the eDRX cycle duration of the relay device.

Optionally, when the power consumption parameter includes the eDRX cycle duration, the processing unit 1102 is further configured to determine an activation time period and a data forwarding time period in an eDRX cycle of the relay device and a sleep time period and a data forwarding time period in an eDRX cycle of the terminal device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device; and the sending unit 1103 is further configured to send the activation time period and the data forwarding time period in the eDRX cycle of the relay device and the sleep time period and the data forwarding time period in the eDRX cycle of the terminal device to the relay device; or the processing unit 1102 is further configured to determine a sleep time period and a data forwarding time period in an eDRX cycle of the relay device and a sleep time period and a data forwarding time period in an eDRX cycle of the terminal device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device; and the sending unit 1103 is further configured to send the sleep time period and the data forwarding time period in the eDRX cycle of the relay device and the sleep time period and the data forwarding time period in the eDRX cycle of the terminal device to the relay device.

According to the core network control plane device provided by this embodiment of this application, when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. The expected value of the power consumption parameter of the terminal device may reflect a data transmission requirement and a power consumption reduction requirement of the terminal device, and the expected value of the power consumption parameter of the relay device may reflect a data transmission requirement and a power consumption reduction requirement of the relay device. Therefore, the configured value of the power consumption parameter of the relay device satisfies the data transmission requirement of the terminal device, and ensures data transmission efficiency of the terminal device. This avoids data transmission failure caused by sending data to a network side by the terminal device through the relay device when the relay device is in a sleep state. In addition, the configured value of the power consumption parameter of the relay device and the configured value of the power consumption parameter of the terminal device also satisfy the power consumption reduction requirements of the relay device and the terminal device.

Figure 12:
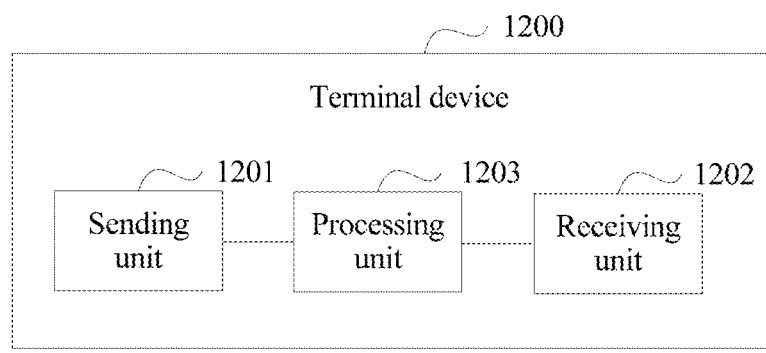
FIG. 12 is a first structural diagram of a terminal device according to an embodiment of this application.

Based on the foregoing embodiment, an embodiment of this application further provides a terminal device. The terminal device is configured to implement the method for configuring a power consumption parameter as shown in FIG. 2. Referring to FIG. 12, the terminal device 1200 includes a sending unit 1201, a receiving unit 1202, and a processing unit 1203.

The sending unit 1201 is configured to send an expected value of a power consumption parameter to a relay device.

The receiving unit 1202 is configured to receive a configured value of the power consumption parameter of the terminal device from the relay device.

The processing unit 1203 is configured to set the power consumption parameter of the terminal device based on the configured value, or release a connection between the terminal device and the relay device.

Optionally, the power consumption parameter includes at least one of power saving mode PSM activation time, periodic location update timer duration, and extended discontinuous reception eDRX cycle duration.

Optionally, when the power consumption parameter includes the eDRX cycle duration, the receiving unit 1202 is further configured to:

receive a sleep time period and a data forwarding time period in an eDRX cycle of the terminal device from the relay device.

According to the terminal device provided by this embodiment of this application, the terminal device may send the expected value of the power consumption parameter to a core network control plane device through the relay device, so that when the core network control plane device determines a configured value of a power consumption parameter of the relay device and the configured value of the power consumption parameter of the terminal device, the expected value of the power consumption parameter of the terminal device and an expected value of the power consumption parameter of the relay device are considered. This can not only reduce power consumption of the terminal device, but also avoid data transmission failure caused by sending data to a network side by the terminal device through the relay device when the relay device is in a sleep state, and ensure data transmission efficiency of the terminal device.

Figure 13:
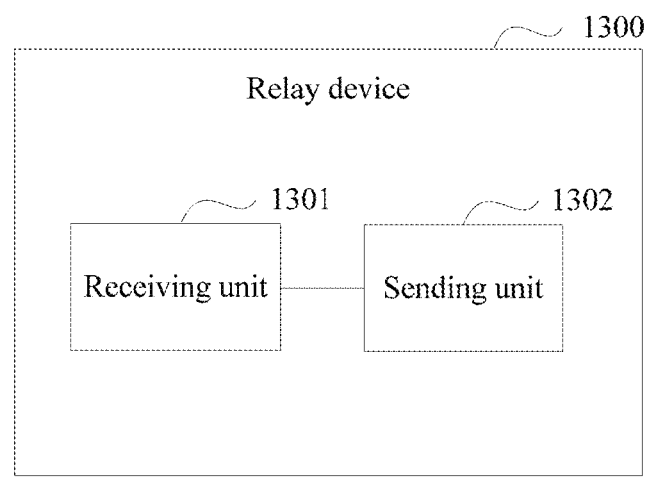
FIG. 13 is a first structural diagram of a relay device according to an embodiment of this application.

Based on the foregoing embodiment, an embodiment of this application further provides a relay device. The relay device is configured to implement the method for configuring a power consumption parameter as shown in FIG. 2. Referring to FIG. 13, the terminal device 1300 includes a receiving unit 1301 and a sending unit 1302.

The receiving unit 1301 is configured to receive an expected value of a power consumption parameter of a terminal device.

The sending unit 1302 is configured to send the expected value of the power consumption parameter of the terminal device and an expected value of the power consumption parameter of the relay device to a core network control plane device.

The receiving unit 1301 is further configured to receive a configured value of the power consumption parameter of the relay device and a configured value of the power consumption parameter of the terminal device from the core network control plane device.

The sending unit 1302 is further configured to send the configured value of the power consumption parameter of the terminal device to the terminal device.

Optionally, the power consumption parameter includes at least one of power saving mode PSM activation time, periodic location update timer duration, and extended discontinuous reception eDRX cycle duration.

Optionally, when the power consumption parameter includes the eDRX cycle duration, the receiving unit 1301 is further configured to:

receive an activation time period and a data forwarding time period in an eDRX cycle of the relay device or a sleep time period and a data forwarding time period in an eDRX cycle of the relay device and a sleep time period and a data forwarding time period in an eDRX cycle of the terminal device from the core network control plane device, where the data forwarding time period in the eDRX cycle of the terminal device is the same as the data forwarding time period in the eDRX cycle of the relay device; and the sending unit 1302 is further configured to send the sleep time period and the data forwarding time period in the eDRX cycle of the terminal device to the terminal device.

According to the relay device provided by this embodiment of this application, the relay device may send the expected value of the power consumption parameter of the relay device and the expected value of the power consumption parameter of the terminal device to the core network control plane device, so that when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. This can not only reduce power consumption of the relay device and the terminal device, but also avoid data transmission failure caused by sending data to a network side by the terminal device through the relay device when the relay device is in a sleep state, and ensure data transmission efficiency of the terminal device.

Figure 14:
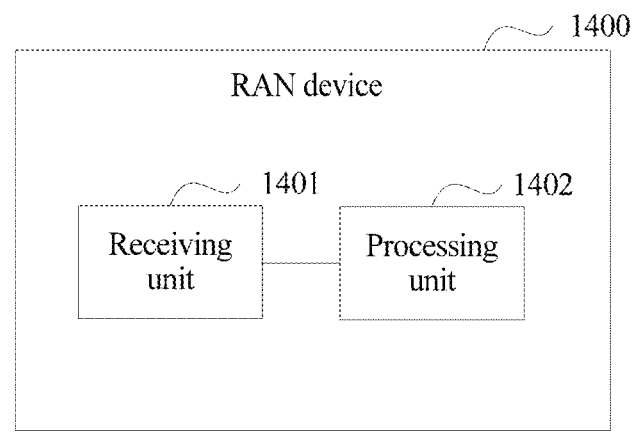
FIG. 14 is a first structural diagram of a RAN device according to an embodiment of this application.

Based on the foregoing embodiment, an embodiment of this application further provides a RAN device. The RAN device is configured to implement the method for configuring a power consumption parameter. Referring to FIG. 14, the RAN device 1400 includes a receiving unit 1401 and a processing unit 1402.

The receiving unit 1401 is configured to receive extended discontinuous reception eDRX deactivation information sent by a core network control plane device.

The processing unit 1402 is configured to broadcast a system broadcast message based on the eDRX deactivation information, where the system broadcast message indicates that an eDRX function of the RAN device is not enabled.

According to the RAN device provided by this embodiment of this application, after fault recovery of the core network control plane device in a mobile communications system, the RAN device sends the system broadcast message to instruct a relay device and a terminal device accessing the RAN device not to enable the eDRX function. This prevents the relay device and the terminal device in the mobile communications system from continuing to enable the eDRX function, and avoids impact on service processing of the terminal device.

Figure 15:
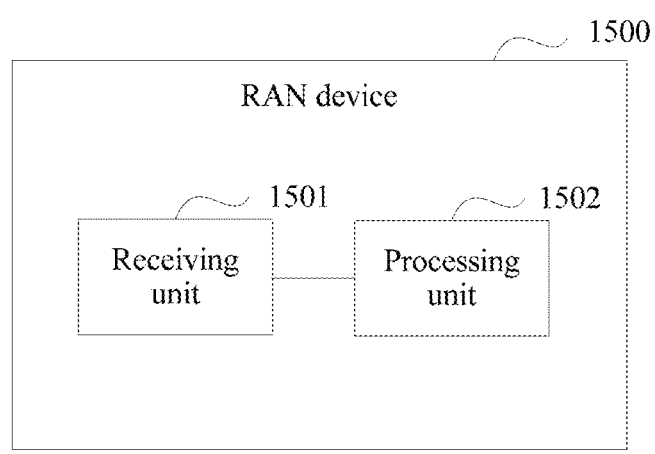
FIG. 15 is a second structural diagram of a RAN device according to an embodiment of this application.

Based on the foregoing embodiment, an embodiment of this application further provides a RAN device. The RAN device is configured to implement the method for configuring a power consumption parameter. Referring to FIG. 15, the RAN device 1500 includes a receiving unit 1501 and a processing unit 1502.

The receiving unit 1501 is configured to receive a paging message sent by a core network control plane device, where the paging message carries an international mobile subscriber identity IMSI of a terminal device.

The processing unit 1502 is configured to broadcast a system broadcast message when an extended discontinuous reception eDRX function of the RAN device is enabled, where the system broadcast message indicates that the eDRX function of the RAN device is not enabled.

According to the RAN device provided by this embodiment of this application, after fault recovery of the core network control plane device in a mobile communications system, the RAN device sends the system broadcast message to instruct a relay device and the terminal device accessing the RAN device not to enable the eDRX function. This prevents the relay device and the terminal device in the mobile communications system from continuing to enable the eDRX function, and avoids impact on service processing of the terminal device.

It should be noted that, in the embodiments of this application, unit division is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Figure 16:
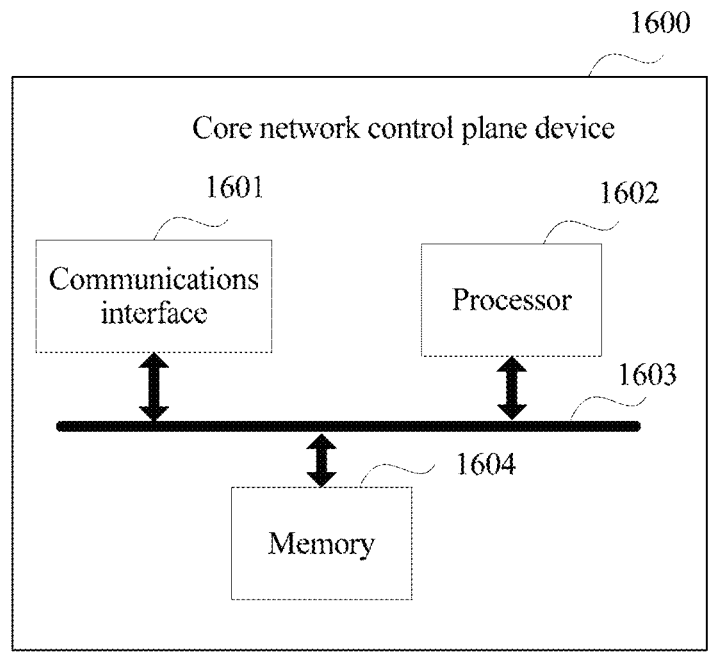
FIG. 16 is a second structural diagram of a core network control plane device according to an embodiment of this application.

Based on the foregoing embodiment, an embodiment of this application further provides a core network control plane device. The core network control plane device is configured to implement the method for configuring a power consumption parameter as shown in FIG. 2, and has a function of the core network control plane device 1100 shown in FIG. 11. Referring to FIG. 16, the core network control plane device includes a communications interface 1601, a processor 1602, and a memory 1604. The communications interface 1601, the processor 1602, and the memory 1604 are interconnected.

Optionally, the communications interface 1601, the processor 1602, and the memory 1604 are interconnected by a bus 1603. The bus 1603 may be a peripheral component interconnect (PCI) standard bus, an extended industry standard architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

The communications interface 1601 is configured to communicate and interact with another device such as a relay device.

The processor 1602 is configured to implement the method for configuring a power consumption parameter as shown in FIG. 2, including:

receiving an expected value of a power consumption parameter of a relay device and an expected value of a power consumption parameter of a terminal device;

determining a configured value of the power consumption parameter of the relay device and a configured value of the power consumption parameter of the terminal device based on the expected value of the power consumption parameter of the relay device and the expected value of the power consumption parameter of the terminal device; and sending the configured value of the power consumption parameter of the relay device and the configured value of the power consumption parameter of the terminal device to the relay device.

Optionally, the power consumption parameter includes at least one of power saving mode PSM activation time, periodic location update timer duration, and extended discontinuous reception eDRX cycle duration.

Optionally, the determining a configured value of the power consumption parameter of the relay device and a configured value of the power consumption parameter of the terminal device based on the expected value of the power consumption parameter of the relay device and the expected value of the power consumption parameter of the terminal device includes:

determining the configured value of the power consumption parameter of the terminal device based on the expected value of the power consumption parameter of the terminal device; and determining the configured value of the power consumption parameter of the relay device based on the expected value of the power consumption parameter of the relay device and the configured value of the power consumption parameter of the terminal device.

Optionally, when a quantity of such terminal devices is greater than 1, the power consumption parameter includes the PSM activation time, a configured value of PSM activation time of the relay device is greater than or equal to a largest one of configured values of PSM activation time of the terminal devices, and the configured value of the PSM activation time of the relay device is greater than or equal to an expected value of the PSM activation time of the relay device; and/or the power consumption parameter includes the periodic location update timer duration, a configured value of periodic location update timer duration of the relay device is less than or equal to a smallest one of configured values of periodic location update timer duration of the terminal devices, and the configured value of the periodic location update timer duration of the relay device is less than or equal to an expected value of the periodic location update timer duration of the relay device.

Optionally, the determining the configured value of the power consumption parameter of the terminal device based on the expected value of the power consumption parameter of the terminal device includes:

determining the configured value of the power consumption parameter of the terminal device based on subscription data of the power consumption parameter of the terminal device and the expected value of the power consumption parameter of the terminal device; and the determining the configured value of the power consumption parameter of the relay device based on the expected value of the power consumption parameter of the relay device and the configured value of the power consumption parameter of the terminal device includes:

determining the configured value of the power consumption parameter of the relay device based on subscription data of the power consumption parameter of the relay device, the expected value of the power consumption parameter of the relay device, and the configured value of the power consumption parameter of the terminal device, where the configured value of the power consumption parameter of the relay device belongs to the subscription data of the power consumption parameter of the relay device.

Optionally, the power consumption parameter includes the PSM activation time, and both a configured value of PSM activation time of the relay device and a configured value of PSM activation time of the terminal device are a larger one of an expected value of the PSM activation time of the terminal device and an expected value of the PSM activation time of the relay device; or the power consumption parameter includes the periodic location update timer duration, and both a configured value of periodic location update timer duration of the relay device and a configured value of periodic location update timer duration of the terminal device are a smaller one of an expected value of the periodic location update timer duration of the terminal device and an expected value of the periodic location update timer duration of the relay device; or the power consumption parameter includes the eDRX cycle duration, and both a configured value of eDRX cycle duration of the relay device and a configured value of eDRX cycle duration of the terminal device are a smaller one of an expected value of the eDRX cycle duration of the terminal device and an expected value of the eDRX cycle duration of the relay device.

Optionally, the determining a configured value of the power consumption parameter of the relay device based on the expected value of the power consumption parameter of the relay device and the expected value of the power consumption parameter of the terminal device includes:

determining a candidate configured value of the power consumption parameter of the terminal device based on subscription data of the power consumption parameter of the terminal device and the expected value of the power consumption parameter of the terminal device;

determining a candidate configured value of the power consumption parameter of the relay device based on subscription data of the power consumption parameter of the relay device and the expected value of the power consumption parameter of the relay device; and determining the configured value of the power consumption parameter of the relay device and the configured value of the power consumption parameter of the terminal device based on the candidate configured value of the power consumption parameter of the relay device and the candidate configured value of the power consumption parameter of the terminal device.

Optionally, the power consumption parameter includes the PSM activation time, and both a configured value of PSM activation time of the relay device and a configured value of PSM activation time of the terminal device are a larger one of a candidate configured value of the PSM activation time of the relay device and a candidate configured value of the PSM activation time of the terminal device; or the power consumption parameter includes the periodic location update timer duration, and both a configured value of periodic location update timer duration of the relay device and a configured value of periodic location update timer duration of the terminal device are a smaller one of a candidate configured value of the periodic location update timer duration of the relay device and a candidate configured value of the periodic location update timer duration of the terminal device; or the power consumption parameter includes the eDRX cycle duration, and both a configured value of eDRX cycle duration of the relay device and a configured value of eDRX cycle duration of the terminal device are a smaller one of a candidate configured value of the eDRX cycle duration of the terminal device and a candidate configured value of the eDRX cycle duration of the relay device.

Optionally, when the power consumption parameter includes the eDRX cycle duration, the processor 1602 is further configured to:

determine an activation time period and a data forwarding time period in an eDRX cycle of the relay device and a sleep time period and a data forwarding time period in an eDRX cycle of the terminal device, and send the activation time period and the data forwarding time period in the eDRX cycle of the relay device and the sleep time period and the data forwarding time period in the eDRX cycle of the terminal device to the relay device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device; or determine a sleep time period and a data forwarding time period in an eDRX cycle of the relay device and a sleep time period and a data forwarding time period in an eDRX cycle of the terminal device, and send the sleep time period and the data forwarding time period in the eDRX cycle of the relay device and the sleep time period and the data forwarding time period in the eDRX cycle of the terminal device to the relay device, where the data forwarding time period in the eDRX cycle of the terminal device is the same as the data forwarding time period in the eDRX cycle of the relay device, and both duration of the eDRX cycle of the relay device and duration of the eDRX cycle of the terminal device are the configured value of the eDRX cycle duration of the relay device.

The memory 1604 is configured to store an application program or the like. Specifically, the application program may include program code, and the program code includes a computer operation instruction. The memory 1604 may include a random access memory (RAM), or may further include a non-volatile memory, for example, at least one magnetic disk memory. The processor 1602 executes the application program stored in the memory 1604 to implement the foregoing function, to implement the method for configuring a power consumption parameter as shown in FIG. 2.

According to the core network control plane device provided by this embodiment of this application, when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. The expected value of the power consumption parameter of the terminal device may reflect a data transmission requirement and a power consumption reduction requirement of the terminal device, and the expected value of the power consumption parameter of the relay device may reflect a data transmission requirement and a power consumption reduction requirement of the relay device. Therefore, the configured value of the power consumption parameter of the relay device satisfies the data transmission requirement of the terminal device, and ensures data transmission efficiency of the terminal device. This avoids data transmission failure caused by sending data to a network side by the terminal device through the relay device when the relay device is in a sleep state. In addition, the configured value of the power consumption parameter of the relay device and the configured value of the power consumption parameter of the terminal device also satisfy the power consumption reduction requirements of the relay device and the terminal device.

Figure 17:
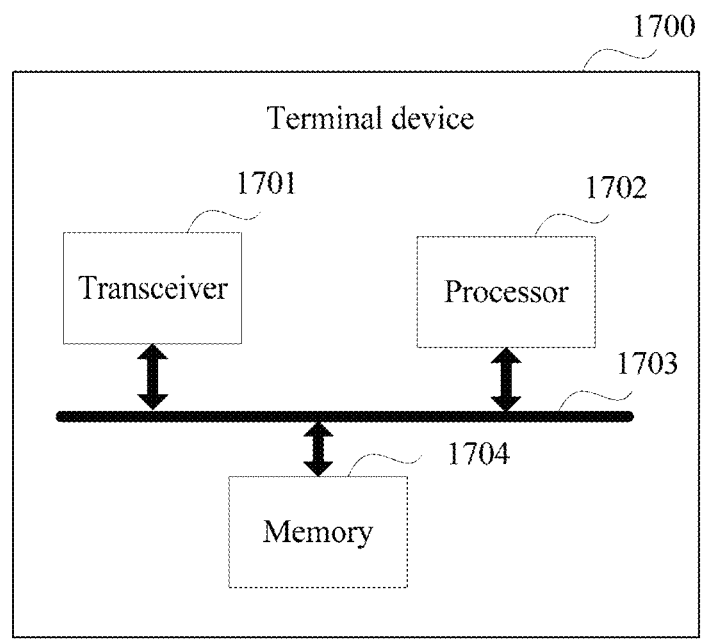
FIG. 17 is a second structural diagram of a terminal device according to an embodiment of this application.

Based on the foregoing embodiment, an embodiment of this application further provides a terminal device. The terminal device is configured to implement the method for configuring a power consumption parameter as shown in FIG. 2, and has a function of the terminal device 1200 shown in FIG. 12. Referring to FIG. 17, the terminal device includes a transceiver 1701, a processor 1702, and a memory 1704. The transceiver 1701, the processor 1702, and the memory 1704 are interconnected.

Optionally, the transceiver 1701, the processor 1702, and the memory 1704 are interconnected by a bus 1703. The bus 1703 may be a PCI bus, an EISA bus, or the like. The bus may be classified into an address bus, a data bus, a control bus, and the like. For ease of representation, only one thick line is used to represent the bus in FIG. 17, but this does not mean that there is only one bus or only one type of bus.

The transceiver 1701 is configured to communicate and interact with a relay device.

The processor 1702 is configured to implement the method for configuring a power consumption parameter as shown in FIG. 2, including:

sending an expected value of a power consumption parameter to a relay device;

receiving a configured value of the power consumption parameter of the terminal device from the relay device; and setting the power consumption parameter of the terminal device based on the configured value, or releasing a connection between the terminal device and the relay device.

Optionally, the power consumption parameter includes at least one of power saving mode PSM activation time, periodic location update timer duration, and extended discontinuous reception eDRX cycle duration.

Optionally, when the power consumption parameter includes the eDRX cycle duration, the processor 1702 is further configured to:

receive a sleep time period and a data forwarding time period in an eDRX cycle of the terminal device from the relay device.

The memory 1704 is configured to store an application program or the like. Specifically, the application program may include program code, and the program code includes a computer operation instruction. The memory 1704 may include a RAM, or may further include a non-volatile memory, for example, at least one magnetic disk memory. The processor 1702 executes the application program stored in the memory 1704 to implement the foregoing function, to implement the method for configuring a power consumption parameter as shown in FIG. 2.

According to the terminal device provided by this embodiment of this application, the terminal device may send the expected value of the power consumption parameter to a core network control plane device through the relay device, so that when the core network control plane device determines a configured value of a power consumption parameter of the relay device and the configured value of the power consumption parameter of the terminal device, the expected value of the power consumption parameter of the terminal device and an expected value of the power consumption parameter of the relay device are considered. This can not only reduce power consumption of the terminal device, but also avoid data transmission failure caused by sending data to a network side by the terminal device through the relay device when the relay device is in a sleep state, and ensure data transmission efficiency of the terminal device.

Figure 18:
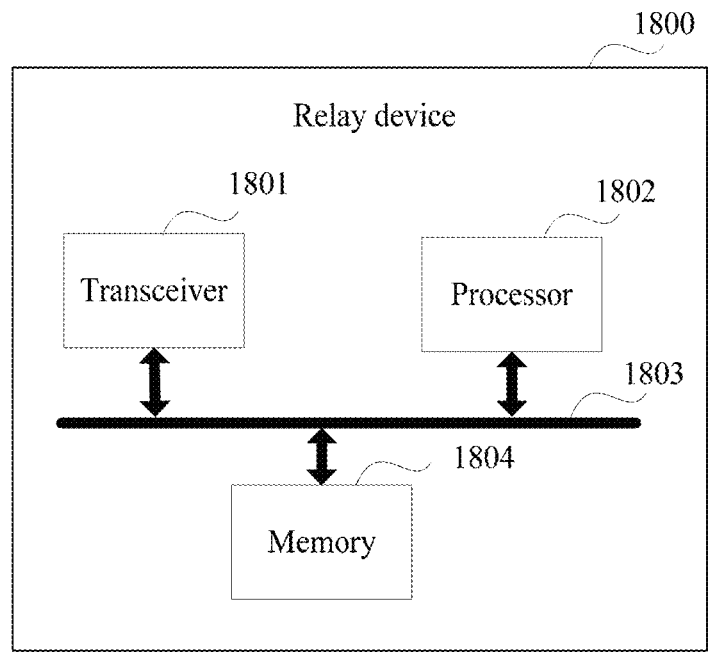
FIG. 18 is a second structural diagram of a relay device according to an embodiment of this application.

Based on the foregoing embodiment, an embodiment of this application further provides a relay device. The relay device is configured to implement the method for configuring a power consumption parameter as shown in FIG. 2, and has a function of the relay device 1300 shown in FIG. 13. Referring to FIG. 18, the relay device 1800 includes a transceiver 1801, a processor 1802, and a memory 1804. The transceiver 1801, the processor 1802, and the memory 1804 are interconnected.

Optionally, the transceiver 1801, the processor 1802, and the memory 1804 are interconnected by a bus 1803. The bus 1803 may be a PCI bus, an EISA bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to communicate and interact with a core network control plane device.

The processor 1802 is configured to implement the method for configuring a power consumption parameter as shown in FIG. 2, including:

receiving an expected value of a power consumption parameter of a terminal device;

sending the expected value of the power consumption parameter of the terminal device and an expected value of the power consumption parameter of the relay device to a core network control plane device;

receiving a configured value of the power consumption parameter of the relay device and a configured value of the power consumption parameter of the terminal device from the core network control plane device; and sending the configured value of the power consumption parameter of the terminal device to the terminal device.

Optionally, the power consumption parameter includes at least one of power saving mode PSM activation time, periodic location update timer duration, and extended discontinuous reception eDRX cycle duration.

Optionally, when the power consumption parameter includes the eDRX cycle duration, the processor 1802 is further configured to:

receive an activation time period and a data forwarding time period in an eDRX cycle of the relay device or a sleep time period and a data forwarding time period in an eDRX cycle of the relay device and a sleep time period and a data forwarding time period in an eDRX cycle of the terminal device from the core network control plane device, where the data forwarding time period in the eDRX cycle of the terminal device is the same as the data forwarding time period in the eDRX cycle of the relay device; and send the sleep time period and the data forwarding time period in the eDRX cycle of the terminal device to the terminal device.

The memory 1804 is configured to store an application program or the like. Specifically, the application program may include program code, and the program code includes a computer operation instruction. The memory 1804 may include a RAM, or may further include a non-volatile memory, for example, at least one magnetic disk memory. The processor 1802 executes the application program stored in the memory 1804 to implement the foregoing function, to implement the method for configuring a power consumption parameter as shown in FIG. 2.

According to the relay device provided by this embodiment of this application, the relay device may send the expected value of the power consumption parameter of the relay device and the expected value of the power consumption parameter of the terminal device to the core network control plane device, so that when the core network control plane device determines the configured value of the power consumption parameter of the relay device and the configured value of the power consumption parameter of the terminal device, the expected value of the power consumption parameter of the terminal device and the expected value of the power consumption parameter of the relay device are considered. This can not only reduce power consumption of the relay device and the terminal device, but also avoid data transmission failure caused by sending data to a network side by the terminal device through the relay device when the relay device is in a sleep state, and ensure data transmission efficiency of the terminal device.

Figure 19:
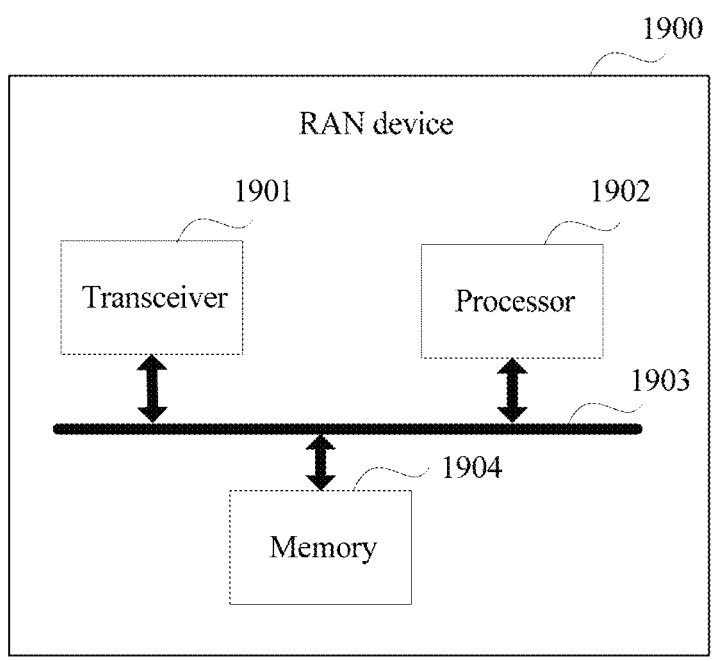
FIG. 19 is a third structural diagram of a RAN device according to an embodiment of this application.

Based on the foregoing embodiment, an embodiment of this application further provides a RAN device. The RAN device is configured to implement the method for configuring a power consumption parameter in the foregoing embodiment, and has a function of the RAN device 1400 shown in FIG. 14. Referring to FIG. 19, the RAN device includes a transceiver 1901, a processor 1902, and a memory 1904. The transceiver 1901, the processor 1902, and the memory 1904 are interconnected.

Optionally, the transceiver 1901, the processor 1902, and the memory 1904 are interconnected by a bus 1903. The bus 1903 may be a PCI bus, an EISA bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to communicate and interact with another device such as a core network control plane device.

The processor 1902 is configured to implement the method for configuring a power consumption parameter in the foregoing embodiment, including:

receiving extended discontinuous reception eDRX deactivation information sent by a core network control plane device; and broadcasting a system broadcast message based on the eDRX deactivation information, where the system broadcast message indicates that an eDRX function of the RAN device is not enabled.

The memory 1904 is configured to store an application program or the like. Specifically, the application program may include program code, and the program code includes a computer operation instruction. The memory 1904 may include a RAM, or may further include a non-volatile memory, for example, at least one magnetic disk memory. The processor 1902 executes the application program stored in the memory 1904 to implement the foregoing function, to implement the method for configuring a power consumption parameter in the foregoing embodiment.

According to the RAN device provided by this embodiment of this application, after fault recovery of the core network control plane device in a mobile communications system, the RAN device sends the system broadcast message to instruct a relay device and a terminal device accessing the RAN device not to enable the eDRX function. This prevents the relay device and the terminal device in the mobile communications system from continuing to enable the eDRX function, and avoids impact on service processing of the terminal device.

Figure 20:
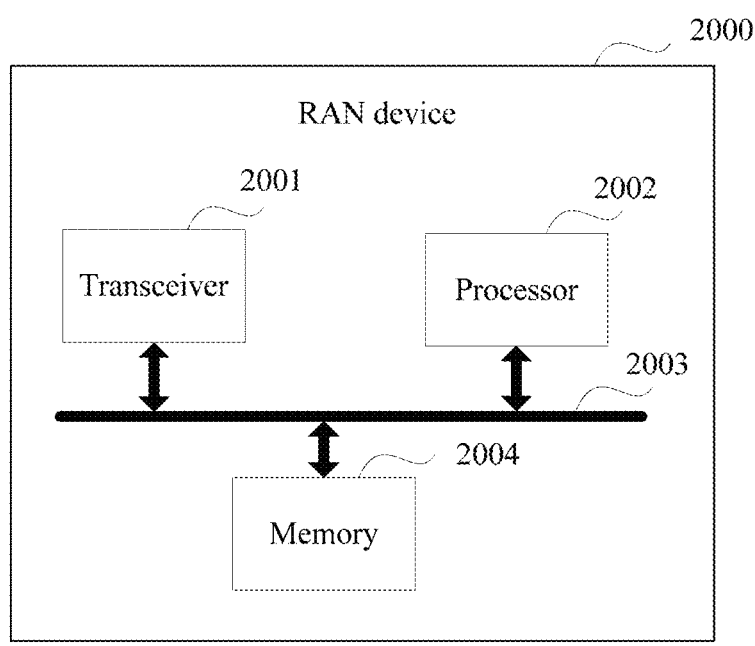
FIG. 20 is a fourth structural diagram of a RAN device according to an embodiment of this application.

Based on the foregoing embodiment, an embodiment of this application further provides a RAN device. The RAN device is configured to implement the method for configuring a power consumption parameter in the foregoing embodiment, and has a function of the RAN device 1500 shown in FIG. 15. Referring to FIG. 20, the RAN device 2000 includes a transceiver 2001, a processor 2002, and a memory 2004. The transceiver 2001, the processor 2002, and the memory 2004 are interconnected.

Optionally, the transceiver 2001, the processor 2002, and the memory 2004 are interconnected by a bus 2003. The bus 2003 may be a PCI bus, an EISA bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to communicate and interact with another device such as a core network control plane device.

The processor 2002 is configured to implement the method for configuring a power consumption parameter in the foregoing embodiment, including:

receiving a paging message sent by a core network control plane device, where the paging message carries an international mobile subscriber identity IMSI of a terminal device; and broadcasting a system broadcast message when an extended discontinuous reception eDRX function of the RAN device is enabled, where the system broadcast message indicates that the eDRX function of the RAN device is not enabled.

The memory 2004 is configured to store an application program or the like. Specifically, the program may include program code, and the program code includes a computer operation instruction. The memory 2004 may include a RAM, or may further include a non-volatile memory, for example, at least one magnetic disk memory. The processor 2002 executes the application program stored in the memory 2004 to implement the foregoing function, to implement the method for configuring a power consumption parameter in the foregoing embodiment.

According to the RAN device provided by this embodiment of this application, after fault recovery of the core network control plane device in a mobile communications system, the RAN device sends the system broadcast message to instruct a relay device and the terminal device accessing the RAN device not to enable the eDRX function. This prevents the relay device and the terminal device in the mobile communications system from continuing to enable the eDRX function, and avoids impact on service processing of the terminal device.

In conclusion, the embodiments of this application provide a method and an apparatus for configuring a power consumption parameter. In the method, when a core network control plane device determines a configured value of a power consumption parameter of a relay device and a configured value of a power consumption parameter of a terminal device, an expected value of the power consumption parameter of the terminal device and an expected value of the power consumption parameter of the relay device are considered. The expected value of the power consumption parameter of the terminal device may reflect a data transmission requirement and a power consumption reduction requirement of the terminal device, and the expected value of the power consumption parameter of the relay device may reflect a data transmission requirement and a power consumption reduction requirement of the relay device. Therefore, the configured value of the power consumption parameter of the relay device satisfies the data transmission requirement of the terminal device, and ensures data transmission efficiency of the terminal device. This avoids data transmission failure caused by sending data to a network side by the terminal device through the relay device when the relay device is in a sleep state. In addition, the configured value of the power consumption parameter of the relay device and the configured value of the power consumption parameter of the terminal device also satisfy the power consumption reduction requirements of the relay device and the terminal device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. An apparatus, the apparatus comprising at least one processor coupled with a non-transitory storage medium storing executable instructions, wherein the executable instructions, when executed by the at least one processor, cause the at least one processor to:
   receive an expected value of a power consumption parameter of a relay device and an expected value of a power consumption parameter of a terminal device;
   determine a configured value of the power consumption parameter of the relay device and a configured value of the power consumption parameter of the terminal device based on the expected value of the power consumption parameter of the relay device and the expected value of the power consumption parameter of the terminal device; and
   send the configured value of the power consumption parameter of the relay device and the configured value of the power consumption parameter of the terminal device to the relay device.

2. The apparatus according to claim 1, wherein the power consumption parameter comprises at least one of power saving mode (PSM) activation time, periodic location update timer duration, or extended discontinuous reception (eDRX) cycle duration.

3. The apparatus according to claim 2, wherein:
   the power consumption parameter comprises the PSM activation time, wherein both a configured value of PSM activation time of the relay device and a configured value of PSM activation time of the terminal device are a larger one of an expected value of the PSM activation time of the terminal device and an expected value of the PSM activation time of the relay device; or
   the power consumption parameter comprises the periodic location update timer duration, wherein both a configured value of periodic location update timer duration of the relay device and a configured value of periodic location update timer duration of the terminal device are a smaller one of an expected value of the periodic location update timer duration of the terminal device and an expected value of the periodic location update timer duration of the relay device; or
   the power consumption parameter comprises the eDRX cycle duration, wherein both a configured value of eDRX cycle duration of the relay device and a configured value of eDRX cycle duration of the terminal device are a smaller one of an expected value of the eDRX cycle duration of the terminal device and an expected value of the eDRX cycle duration of the relay device.

4. The apparatus according to claim 3, wherein when the power consumption parameter comprises the eDRX cycle duration, the executable instructions further cause the at least one processor to:
   determine an activation time period and a data forwarding time period in an eDRX cycle of the relay device and a sleep time period and a data forwarding time period in an eDRX cycle of the terminal device; and sending the activation time period and the data forwarding time period in the eDRX cycle of the relay device and the sleep time period and the data forwarding time period in the eDRX cycle of the terminal device to the relay device, wherein the data forwarding time period in the eDRX cycle of the terminal device is the same as the data forwarding time period in the eDRX cycle of the relay device, and wherein both duration of the eDRX cycle of the relay device and duration of the eDRX cycle of the terminal device are the configured value of the eDRX cycle duration of the relay device; or
   determine a sleep time period and a data forwarding time period in an eDRX cycle of the relay device and a sleep time period and a data forwarding time period in an eDRX cycle of the terminal device; and sending the sleep time period and the data forwarding time period in the eDRX cycle of the relay device and the sleep time period and the data forwarding time period in the eDRX cycle of the terminal device to the relay device, wherein the data forwarding time period in the eDRX cycle of the terminal device is the same as the data forwarding time period in the eDRX cycle of the relay device, and wherein both duration of the eDRX cycle of the relay device and duration of the eDRX cycle of the terminal device are the configured value of the eDRX cycle duration of the relay device.

5. The apparatus according to claim 1, wherein the executable instructions further cause the at least one processor to:
   determine the configured value of the power consumption parameter of the terminal device based on the expected value of the power consumption parameter of the terminal device; and
   determine the configured value of the power consumption parameter of the relay device based on the expected value of the power consumption parameter of the relay device and the configured value of the power consumption parameter of the terminal device.

6. The apparatus according to claim 5, wherein when a quantity of terminal devices is greater than 1,
   the power consumption parameter comprises the PSM activation time, wherein a configured value of PSM activation time of the relay device is greater than or equal to a largest one of configured values of PSM activation time of the terminal devices, and wherein the configured value of the PSM activation time of the relay device is greater than or equal to an expected value of the PSM activation time of the relay device; or
   the power consumption parameter comprises the periodic location update timer duration, wherein a configured value of periodic location update timer duration of the relay device is less than or equal to a smallest one of configured values of periodic location update timer duration of the terminal devices, and wherein the configured value of the periodic location update timer duration of the relay device is less than or equal to an expected value of the periodic location update timer duration of the relay device.

7. The apparatus according to claim 5, wherein the executable instructions further cause the at least one processor to:
  determine the configured value of the power consumption parameter of the terminal device based on subscription data of the power consumption parameter of the terminal device and the expected value of the power consumption parameter of the terminal device; and
  determine the configured value of the power consumption parameter of the relay device based on subscription data of the power consumption parameter of the relay device, the expected value of the power consumption parameter of the relay device, and the configured value of the power consumption parameter of the terminal device, wherein the configured value of the power consumption parameter of the relay device belongs to the subscription data of the power consumption parameter of the relay device.

8. The apparatus according to claim 1, wherein the executable instructions further cause the at least one processor to:
  determine a candidate configured value of the power consumption parameter of the terminal device based on subscription data of the power consumption parameter of the terminal device and the expected value of the power consumption parameter of the terminal device;
  determine a candidate configured value of the power consumption parameter of the relay device based on subscription data of the power consumption parameter of the relay device and the expected value of the power consumption parameter of the relay device; and
  determine the configured value of the power consumption parameter of the relay device and the configured value of the power consumption parameter of the terminal device based on the candidate configured value of the power consumption parameter of the relay device and the candidate configured value of the power consumption parameter of the terminal device.

9. The apparatus according to claim 8, wherein:
the power consumption parameter comprises the PSM activation time, wherein both a configured value of PSM activation time of the relay device and a configured value of PSM activation time of the terminal device are a larger one of a candidate configured value of the PSM activation time of the relay device and a candidate configured value of the PSM activation time of the terminal device; or
the power consumption parameter comprises the periodic location update timer duration, wherein both a configured value of periodic location update timer duration of the relay device and a configured value of periodic location update timer duration of the terminal device are a smaller one of a candidate configured value of the periodic location update timer duration of the relay device and a candidate configured value of the periodic location update timer duration of the terminal device; or
the power consumption parameter comprises the eDRX cycle duration, wherein both a configured value of eDRX cycle duration of the relay device and a configured value of eDRX cycle duration of the terminal device are a smaller one of a candidate configured value of the eDRX cycle duration of the terminal device and a candidate configured value of the eDRX cycle duration of the relay device.

* * * * *